(12) United States Patent
Yang et al.

(10) Patent No.: US 9,703,577 B2
(45) Date of Patent: Jul. 11, 2017

(54) AUTOMATICALLY EXECUTING APPLICATION USING SHORT RUN INDICATOR ON TERMINAL DEVICE

(71) Applicant: SAMSUNG ELECTRONICS CO., LTD., Suwon-si (KR)

(72) Inventors: Ji-young Yang, Suwon-si (KR); Tae-hwan Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 582 days.

(21) Appl. No.: 14/028,591

(22) Filed: Sep. 17, 2013

(65) Prior Publication Data

US 2014/0082622 A1    Mar. 20, 2014

(30) Foreign Application Priority Data

Sep. 17, 2012  (KR) .................. 10-2012-0102737

(51) Int. Cl.
  *G06F 9/46*    (2006.01)
  *G06F 9/445*   (2006.01)

(52) U.S. Cl.
  CPC .......... *G06F 9/44505* (2013.01); *G06F 9/445* (2013.01)

(58) Field of Classification Search
  CPC ............................. G06F 9/44505; G06F 9/445
  See application file for complete search history.

(56) References Cited

U.S. PATENT DOCUMENTS

| 2002/0085037 | A1* | 7/2002 | Leavitt ............... | G06F 3/04817 715/765 |
| 2006/0005132 | A1  | 1/2006 | Herdeg, III | |
| 2008/0034314 | A1* | 2/2008 | Louch .................. | G06F 3/0481 715/778 |
| 2008/0235728 | A1* | 9/2008 | Kim ..................... | H04N 5/4401 725/39 |
| 2010/0205559 | A1  | 8/2010 | Rose | |

(Continued)

FOREIGN PATENT DOCUMENTS

| GB | WO 2012001428 A1 * | 1/2012 | ......... G06F 3/04815 |
| KR | 1020110051435 A | 5/2011 | |
| KR | 10-2012-0066819 A | 6/2012 | |

OTHER PUBLICATIONS

Park Chan-ho, "The Portable Terminal and the Interfacing Method Using the Same Equipped with the Touch Screen", Dec. 15, 2010, KIPRIS Patent machine translation of Korean patent application KR 10-2012-0066819A, p. 1-9.*

(Continued)

*Primary Examiner* — James J Lee
(74) *Attorney, Agent, or Firm* — Sughrue Mion, PLLC

(57) ABSTRACT

Provided are a method and system for executing an application installed in a device, the device and a recording medium thereof. The method includes: receiving a mapping request signal for requesting a mapping between application execution information and a short run indicator, acquiring the application execution information from an execution starting point of the application up to the receiving of the mapping request signal; generating mapping information comprising a mapping of the acquired application execution information with the short run indicator; and storing the mapping information in at least one of the device and an external device.

21 Claims, 20 Drawing Sheets

(56) References Cited

U.S. PATENT DOCUMENTS

| | | | |
|---|---|---|---|
| 2011/0041140 A1 | 2/2011 | Harm et al. | |
| 2011/0078714 A1 | 3/2011 | Sagayaraj et al. | |
| 2011/0158125 A1* | 6/2011 | Haaparanta | H04M 1/27455 370/254 |
| 2012/0026400 A1* | 2/2012 | Kang | H04N 21/42214 348/570 |
| 2012/0159386 A1* | 6/2012 | Kang | G06F 3/0481 715/800 |
| 2012/0164971 A1 | 6/2012 | Choi et al. | |
| 2012/0176543 A1* | 7/2012 | Jeong | G06F 3/04883 348/563 |
| 2013/0024816 A1* | 1/2013 | Bender | G06F 9/4443 715/835 |
| 2013/0027612 A1* | 1/2013 | Miloseski | H04N 21/47 348/552 |
| 2013/0257749 A1* | 10/2013 | Woods | H04N 21/42207 345/173 |

OTHER PUBLICATIONS

Communication dated Oct. 9, 2014, issued by the European Patent Office in counterpart European Application No. 13184449.0.
Notification for PCT/KR2013/008328 dated Dec. 31, 2013 [PCT/ISA/220].
International Search Report for PCT/KR2013/008328 dated Dec. 31, 2013 [PCT/ISA/210].
Written Opinion for PCT/KR2013/008328 dated Dec. 31, 2013 [PCT/ISA/237].

* cited by examiner

FIG. 6A

| S LOGIN | S CONTACT INFORMATION ADDITION | S PERSON A | . . . . . |
|---|---|---|---|

FIG. 6B

| CH |
|---|
| 300 |
| 301 |
| 302 |
| ⋮ |

FIG. 6C

| SHORT RUN INDICATOR | APPLICATION EXECUTION INFORMATION |
|---|---|
| S CONTACT INFORMATION ADDITION | 1. Skype IDENTIFICATION INFORMATION<br>2. LOGIN INFORMATION<br>3. S CONTACT INFORMATION SCREEN LOCATION INFORMATION (EXECUTION TIME POINT INFORMATION OR MAPPING REQUEST TIME POINT INFORMATION) |

AUTOMATICALLY EXECUTING APPLICATION USING SHORT RUN INDICATOR ON TERMINAL DEVICE

RELATED APPLICATIONS

This application claims priority from Korean Patent Application No. 10-2012-0102737, filed on Sep. 17, 2012, in the Korean Intellectual Property Office, the disclosure of which is hereby incorporated herein in its entirety by reference.

BACKGROUND

1. Field

One of more exemplary embodiments relate to an application, and more particularly, to a method and system for executing an application installed in a device, and the device and a recording medium thereof.

2. Description of the Related Art

Currently, various applications can be executed in devices, such as smart televisions (TVs), smartphones, and tablet personal computers (PCs). That is, various types of applications, such as communication applications including Skype, Chaton, and the like, gaming applications including Angry Birds and the like, education applications, and social network service (SNS) based applications including Facebook and the like, are provided.

However, to execute an application installed in a device, it is cumbersome for a user to sequentially perform procedures set for each application every time the user wishes to use that application.

SUMMARY

One of more exemplary embodiments include a method and system for easily executing an application installed in a device, and the device and a recording medium thereof.

Additional aspects will be set forth in part in the description which follows and, in part, will be apparent from the description, or may be learned by practice of the exemplary embodiments.

According to o an aspect of an exemplary embodiment, a method of executing an application by a device includes: receiving a mapping request signal requesting a mapping between application execution information and a short run indicator during execution of the application by the device; acquiring the application execution information from an execution starting point of the application up to the receiving of the mapping request signal; generating mapping information comprising a mapping of the acquired application execution information with the short run indicator; and storing the mapping information in at least one of the device and an external device.

The method may further include executing the application based on the mapping information in response to receiving a selection signal of the short run indicator after the mapping the acquired application execution information onto the short run indicator.

The executing of the application according to the reception of the selection signal may further include displaying preview information on the application based on a time point of the execution of the application based on the mapping information before executing the application according to the reception of the selection signal.

The preview information may include at least one of screen information of the executed application according to the reception time point of the mapping request signal, and guide information for the screen information of the application according to the reception time point of the mapping request signal.

The generating mapping information including the mapping of the acquired application execution information and the short run indicator may include: displaying, on the device, at least one short run indicator which can be mapped to the acquired application execution information; and generating the mapping information by mapping the acquired application execution information with a short run indicator selected from among the at least one short run indicator being displayed.

The short run indicator may include a channel number, and the channel number may be a vacant channel number classified according to an application type. The external device may be a server connected via a network.

According to an aspect of an exemplary embodiment, a device includes: a communication unit for communicating with an external device; a storage unit for storing an application execution program based on mapping between a short run indicator and application execution information, and storing mapping information; an input information reception unit for receiving user input information; an output unit for outputting user interface information according to the received user input information and information according to execution of an application; and a processor for: receiving a mapping request signal between the application execution information and the short run indicator during execution of the application by the device; acquiring the application execution information from an execution starting point of the application up to a reception time point of the mapping request signal; generating mapping information comprising the acquired application execution information with the short run indicator; and storing the mapping information in at least one of the device and an external device.

According to an aspect of an exemplary embodiment, a system for executing an application includes: a device for acquiring application execution information upon receiving a mapping request signal requesting a mapping between the application execution information and a short run indicator, generating mapping information comprising a mapping of the acquired application execution information and the short run indicator, and storing the mapping information during execution of the application; and an external device for storing the mapping information.

According to an aspect of an exemplary embodiment, a method of executing an application by a device includes: displaying, on the device, guide information for a short run indicator mapping when an execution of the application ends by the device; acquiring application execution information from a starting point of the execution of the application up to the end time point of the execution of the application based on a user input corresponding to the guide information; generating mapping information comprising a mapping of the acquired application execution information with the short run indicator; and storing the mapping information in at least one of the device and an external device.

According to an aspect of an exemplary embodiment, a device includes: a communication unit for communicating with an external device; a storage unit for storing an application execution program based on mapping between a short run indicator and application execution information and storing mapping information; an input information reception unit for receiving user input information; an output unit for outputting user interface information according to the received user input information and information according to execution of an application; and a processor for: displaying, on the device, guide information for short run indicator mapping when an execution of the application is end by the device; acquiring application execution information from a starting point of the execution of the application up to the end time point of the application based on a user input corresponding to the guide information; generating mapping information comprising a mapping of the acquired application execution information with the short run indicator; and storing the mapping information in at least one of the device and an external device.

According to an aspect of an exemplary embodiment, a non-transitory computer-readable storage medium has stored therein program instructions, which when executed by a computer, perform a method of executing an application by a device, the method including: receiving a mapping request signal between application execution information and a short run indicator during execution of the application by the device; acquiring the application execution information from an execution starting point of the application up to a reception time point of the mapping request signal; mapping the acquired application execution information with the short run indicator; and storing mapping information in at least one of the device and an external device.

BRIEF DESCRIPTION OF THE DRAWINGS

These and/or other aspects will become apparent and more readily appreciated from the following description of the exemplary embodiments, taken in conjunction with the accompanying drawings in which:

FIGS. 6A to 6D are diagrams for describing a short run indicator and describing mapping between the short run indicator and application execution information, according to an exemplary embodiment;

DETAILED DESCRIPTION

Figure 1:
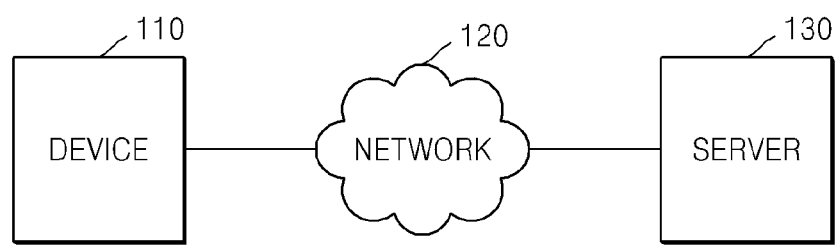
FIG. 1 is a configuration diagram of a system for executing an application, according to an exemplary embodiment.

The present disclosure may allow various kinds of change or modifications and various changes in form. Exemplary embodiments will be illustrated in drawings and described in detail in the specification. However, it should be understood that the exemplary embodiments do not limit the present disclosure to a specific disclosed form but include every modified, equivalent, or replaced one within the spirit and technical scope of the present disclosure.

Although terms such as 'first' and 'second' can be used to describe various elements, the elements cannot be limited by the terms. The terms can be used to distinguish a certain element from another element.

The terminology used in the application is used only to describe exemplary embodiments and does not limit the exemplary embodiments. Although general terms as currently widely used as possible are selected as the terms used in the present disclosure while taking functions in the present disclosure into account, they may vary according to an intention of one of ordinary skill in the art, judicial precedents, or the appearance of new technology. In addition, in specific cases, terms intentionally selected by the applicant may be used, and in this case, the meaning of the terms will be disclosed in a corresponding description of the disclosure. Accordingly, the terms used in the present disclosure should be defined not simply by the terms but by the meaning of the terms and the contents of the present disclosure.

An expression in the singular includes an expression in the plural unless they are clearly different from each other in context. For example, content includes contents throughout the specification. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

"Application" described throughout the specification indicates software for performing a specific function. For example, a communication applications, such as Skype, Chaton, or Kakaotalk, a game application, such as Angry Birds, an education application, a kids application, a position-based application, a fitness application, a social network service based application, such as Facebook, or the like may be included in the application described above, but the application is not limited thereto. The application may be referred to as an application program.

"Short run" described throughout the specification indicates automatic execution of an application by using application execution information, which is mapped to a short run indicator.

"Application execution information" described throughout the specification includes information according to an event based on an input of a user up to a reception time point of a short run indicator mapping request signal, after an application is executed, and identification information for the application. Thus, the application execution information may be defined according to the event based on the input of the user until a short run indicator mapping request signal is received after the application is executed and a type of the application.

For example, when a short run indicator mapping request signal is received after login information is input in a Skype application, application execution information may include identification information for the Skype application, the login information (ID and password), and time point information (or page information or screen information) indicating a login time point in the Skype application. For example, if a short run indicator mapping request signal is received during an incoming call from a person A in a Skype application, application execution information may include identification information for the Skype application, login information, contact information of the person A (for example, Skype name of the person A, an e-mail address of the person A, a telephone number of the person A, and the like), and time point information (or page information or screen information) indicating an incoming time point of the call with the person A in the Skype application.

However, even though there is a variation in a time point where a short run indicator mapping request signal is received after an application is executed, application execution information may be the same if an event based on a user input is not generated.

For example, when a short run indicator mapping request signal is received during an incoming call from the person A in a Skype application, application execution information may include identification information for the Skype application, login information, contact information of the person A (for example, Skype name of the person A, an e-mail address of the person A, a telephone number of the person A, and the like), and time point information (or page information or screen information) indicating an incoming time point of the call with the person A in the Skype application as described above. However, if a short run indicator mapping request signal is received after ending the call with the person A in the Skype application, application execution information may be the same as if a short run indicator mapping request signal was received during the incoming call from the person A, because no event based on a user input had been generated during the video call with the person A.

A short run indicator mapping request signal requests a mapping between a short run indicator and application execution information as described above. When an application is being executed by a device, a short run indicator may be input or selected by a user. When an application is not executed by a device, a short run indicator may be used for user input information for automatically executing the application by using application execution information mapped to the short run indicator.

Since a short run indicator can be easily applied to all applications executable by a device, the short run indicator may be referred to as a universal run indicator or a universal indicator. A short run indicator may be differently generated for each application. For example, numeric information "300" may be used as a short run indicator of a Skype application, and numeric information "200" may be used as a short run indicator of an Angry Birds" application.

An image may be used as a short run indicator. For example, an image "" may be used as a short run indicator of a Skype application, and an image "" may be used as a short run indicator of an education application, but exemplary embodiments are not limited thereto. An image used as a short run indicator may be an image or symbol through which a user can easily recognize a corresponding application.

A short run indicator may be defined by information, an image, or a symbol indicating an application type and an application execution time point. For example, a short run indicator indicating from an execution start operation of a kid's application to a time setting operation may be set as "kid's time setting" or a corresponding image or symbol.

A short run indicator may be differently generated according to an application execution step or an application execution detail. For example, numeric information "300" may be used as a short run indicator for designating an incoming time point of a call with the person A by executing a Skype application, and numeric information "301" may be used as a short run indicator for designating an incoming time point of a call with a person B by executing the Skype application. In addition, a short run indicator that is used at a login time point of the Skype application may differ from a short run indicator that is used at a call incoming time point of the Skype application. Accordingly, a user may perceive an execution time point of an application with only a short run indicator.

When numeric information is used as a short run indicator in a smart TV, a vacant channel number may be used as the numeric information. When channel numbers are used, channel numbers may be grouped and used for each application type. For example, channel numbers 300 to 400 may be set for game applications, channel numbers 401 to 500 may be set for SNS-based applications, and channel numbers 501 to 600 may be set for video call applications. When a short run indicator mapping request signal is received, information on channel number selectable according to an application type may be displayed.

When a short run indicator is mapped to application execution information by using a channel number, after a smart TV is turned on, if the channel number is set or another channel number is switched to the channel number, an application may be automatically executed based on the application execution information mapped to the channel number.

"User input information" throughout the specification may depend on a gesture of the user, voice recognition of the user, face recognition of the user, and a physical button control.

A gesture of the user may be variously defined according to an input device. That is, when the input device is based on a touch screen, a gesture of the user may include a touch-based motion of the user on the touch screen, such as tap, touch and hold, double tap, drag, panning, flick, drag and drop, sweep, swipe, or the like, but is not limited thereto. A touch of the user on the touch screen may be performed using a finger of the user or a touch tool. The touch tool may include a stylus pen.

When the input device is based on a motion sensor, user input information may depend on a gesture of the user based on a motion of a device by the user. A motion of the device may include, for example, device shaking, device hitting, or the like. The motion sensor may include an acceleration sensor, a geomagnetic sensor, a gyro sensor, and an orientation sensor.

When the input device is based on a camera, a gesture of the user may include a space gesture based on images captured using the camera. That is, a gesture of the user, which is related to user input information, may be based on a moving direction of a hand or a space gesture or a space motion according to a hand signal, which is captured using the camera.

For example, a pointing location on a screen may be changed according to a moving direction of a hand, and the pointing location on the screen may be determined when clenching a fist. A plurality of pieces of content may be gathered at the determined location, and when the user unclenches his fist and moves his hand, the plurality of pieces of content may be spread in a moving direction of the hand and displayed on the screen. After the plurality of pieces of content are spread and displayed on the screen, if the hand draws a circle in a counter-clockwise direction, a return function may be performed to gather and display the plurality of pieces of content at one location as on the previous screen. The camera may be based on an image sensor or a photo sensor.

When the input device includes a dial, a slider, a switch, a joystick, a click wheel, and the like besides the physical button described above, user input information may depend on a physical control of the input device by the user. When the input device is based on an audio input device, user input information may depend on recognition of a voice of the user based on a spoken language. When the input device is based on a camera, user input information may include information based on face recognition.

The exemplary embodiments will now be described in detail with reference to the accompanying drawings, in which exemplary embodiments are shown. Like reference numerals in the drawings denote like elements, and thus their repetitive description will be omitted.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a system for executing an application, according to an exemplary embodiment. Referring to FIG. 1, the system includes a device 110, a network 120, and a server 130, but is not limited thereto. That is, the system may include more or less components than the components shown in FIG. 1.

The device 110 may be a smart TV, a smartphone, a laptop computer, a tablet PC, a mobile device, a handheld device or a handheld PC, a personal digital assistant (PDA), a digital consumer electronics (CE) device having a communication function and a display function, or the like, but is not limited thereto.

The device 110 may execute at least one application from among the applications described above. An application that is executed in the device 110 is installed in the device 110. However, the device 110 may execute an application installed in the server 130 connected thereto via the network 120. The device 110 may download and execute an application installed in the server 130. However, the device 110 may execute an application installed in the server 130 by performing bi-directional communication with the server 130 via the network 120.

If a short run indicator mapping request signal is received by a user of the device 110 while executing an application by the device 110, the device 110 acquires application execution information from a starting point of application execution up to a reception time point of the short run indicator mapping request signal.

The application execution information is acquired according to an application type, a reception time point of the short run indicator mapping request signal, and an event based on a user input, which is generated up to the reception time point of the short run indicator mapping request signal after the application is executed, but is not limited thereto.

The device 110 maps the acquired application execution information and a short run indicator and stores information on the mapping in the device 110. The device 110 may store the mapping information in the server 130 via the network 120.

When the application ends, the device 110 may display short run indicator mapping guide information. The short run indicator mapping guide information includes information for the user to confirm whether mapping information exists between the short run indicator and the application execution information. When user input information based on the displayed short run indicator mapping guide information is received, the device 110 acquires application execution information up to an application execution end time point. The device 110 may map the acquired application execution information onto the short run indicator and store information on the mapping in the device 110 or the server 130.

The network 120 includes a wired network and a wireless network. The network 120 will be described in detail when a communication unit 708 of FIG. 7 to be described below is described.

The server 130 may store information and may transmit the stored information to the device 110, according to a request of the device 110. The stored information may include information on the mapping between the short run indicator and the application execution information.

The server 130 may store at least one application executable in the device 110. The server 130 may provide an application to the device 110 according to a request of the device 110. The server 130 may execute an application according to a signal received from the device 110 and transmit or share information generated upon executing the application to or with the device 110 without transmitting the application to the device 110. The server 130 may be a cloud server and an application providing server. However, the server 130 may be a device having a function similar to the device 110. Thus, the server 130 may be referred to as an external device of the device 110.

When the server 130 is an external device of the device 110, the network 120 may include wireless communication, such as Bluetooth communication, Wi-Fi communication, Wi-Fi Direct (WFD) communication, ZigBee communication, or radio frequency identification (RF-ID) communication, or the like, but is not limited thereto. For example, the network 120 may be constructed based on a home network or a universal serial bus (USB).

Figure 2:
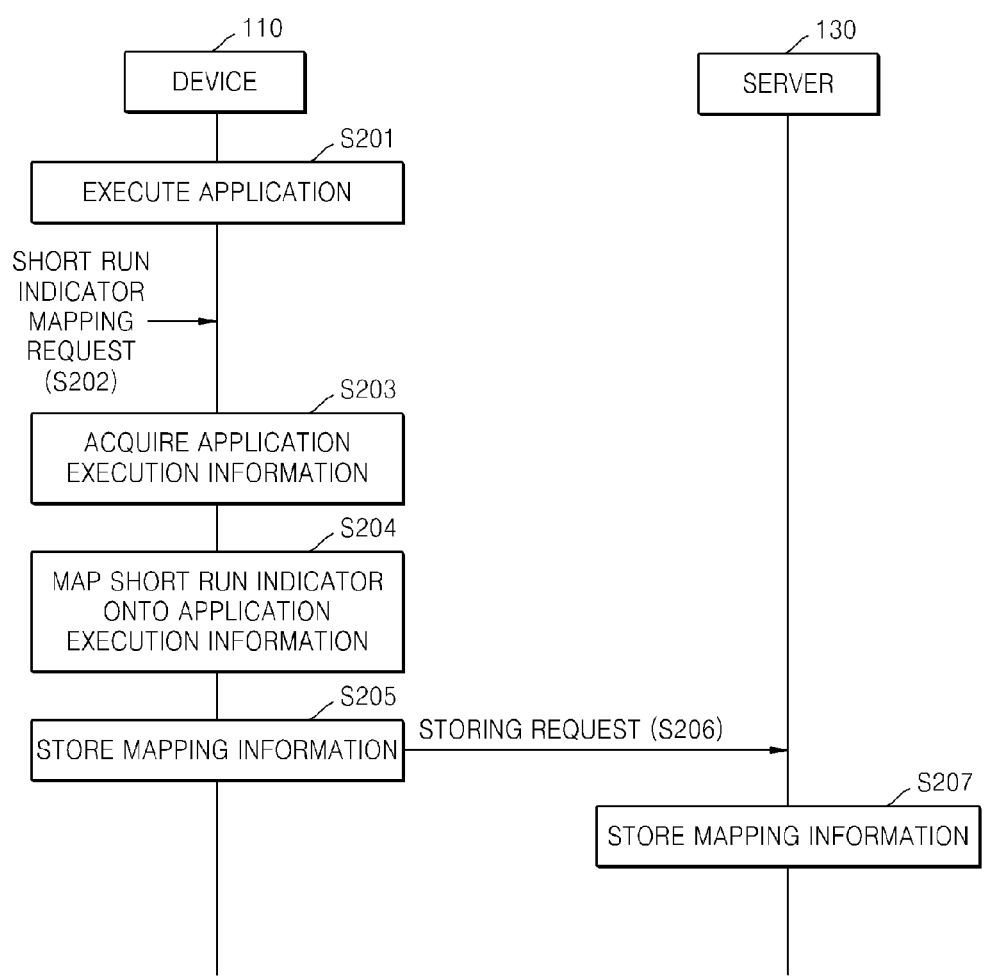
FIG. 2 is a signaling diagram for describing a method of executing an application, according to an exemplary embodiment.

FIG. 2 is a signaling diagram for describing a method of executing an application, according to an exemplary embodiment.

Referring to FIG. 2, in operation S201, the device 110 executes an application. The application being executed may be stored in the device 110 or the server 130 as described above.

When the device 110 starts to execute the application, the device 110 may store all information generated by the execution of the application. In this case, the information stored in the device 110 may be referred to as operation information, i.e., log information, of the device 110. The log information is based on the user's actions or inputs when using the device 110. For example, the log information includes the entire operation information of the device 110 used to perceive what task is performed and what instructions are used by the user using the device 110, from the time that the device 110 is turned on until the time that the device 110 is turned off. The log information stored in the device 110 may be automatically removed if a storing request of the user is not received once the execution of the application ends.

FIGS. 3A to 3F illustrate screens for describing the method of executing an application, according to an exemplary embodiment, wherein the application is a Skype application. However, the screens of the Skype application are not limited to the screens shown in FIGS. 3A to 3F. Screens according to a process of executing the Skype application may vary according to a type of the device 110. For example, screens according to a process of executing the Skype application when the device 110 is a smart TV may differ from screens according to a process of executing the Skype application when the device 110 is a smartphone. In addition, screens according to a process of executing the Skype application when the device 110 is a PC may differ from screens according to a process of executing the Skype application when the device 110 is a smart TV.

Figure 3A:
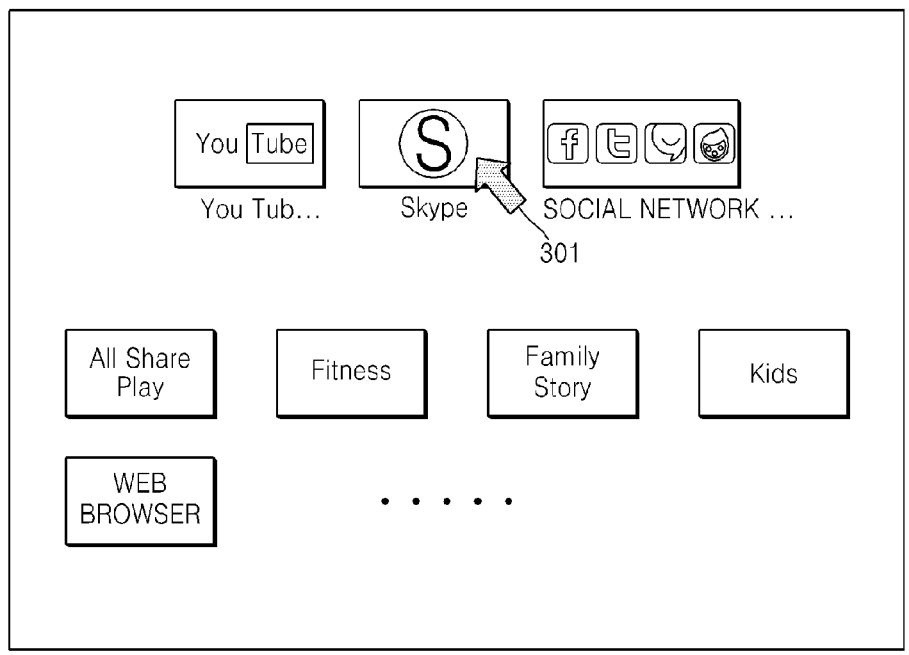
FIGS. 3A to 3F illustrate screens for describing a method of executing an application, according to an exemplary embodiment.
Figure 3B:
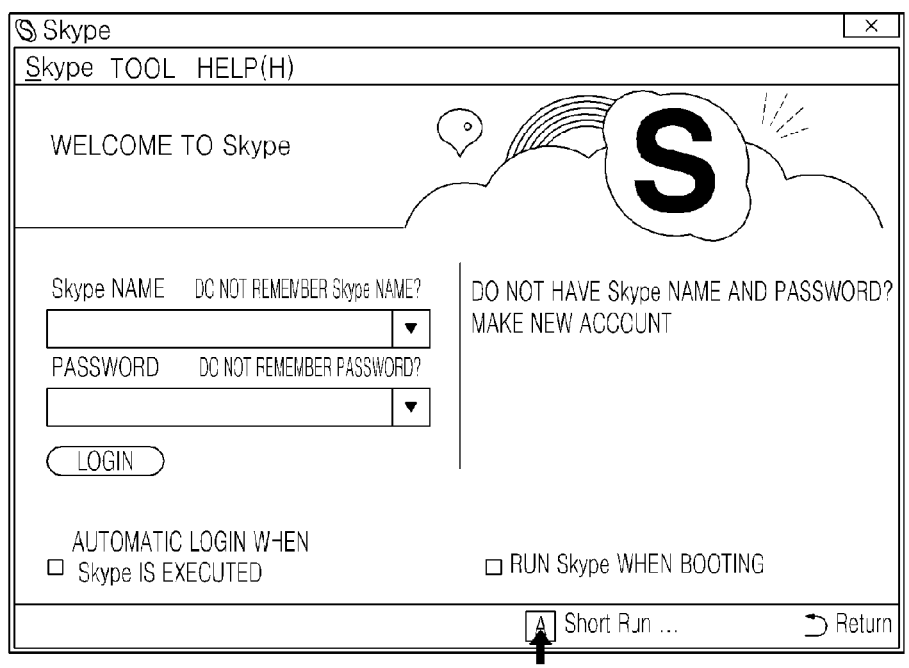

FIG. 3A illustrates a screen for describing a selection of an icon of the Skype application from among icons of various applications. When icons of various applications as shown in FIG. 3A are displayed on the device 110, if user input information for placing a pointer 301 on the icon of the Skype application is received, and user input information for selecting the icon of the Skype application is received, the device 110 executes the Skype application. Accordingly, the device 110 displays a screen for inputting login information for the Skype application as shown in FIG. 3B. In FIG. 3A, the pointer 301 is shown as an arrow, but a symbol of the pointer 301 is not limited thereto.

Referring to FIG. 3B, information A for requesting a mapping between a short run indicator and application execution information is also displayed on the bottom of the screen. Information for requesting a short run indicator mapping is not limited to information A. User input information used with the information A for requesting a short run indicator mapping may be input based on any one of the methods described in the user input information which has been described above. A display location of the information A for requesting a mapping for short run is not limited to the bottom of the screen. According to the display of the information A on the screen, the user may perceive that a short run for a corresponding application on a corresponding screen can be set. Thus, the information A may be referred to as information indicating that a short run setting command or short run can be set.

Based on the screen shown in FIG. 3B, if a signal for requesting a mapping between a short run indicator and application execution information by using the information A (hereinafter, referred to as "mapping request signal") is not received, and login information and user input information for logging in to an application are received, a screen displayed on the device 110 is changed from the screen shown in FIG. 3B to a screen shown in FIG. 3C on which a friend can be added. On the screen shown in FIG. 3C, the information A for requesting a mapping of a short run is also displayed on the bottom thereof.

Figure 3C:
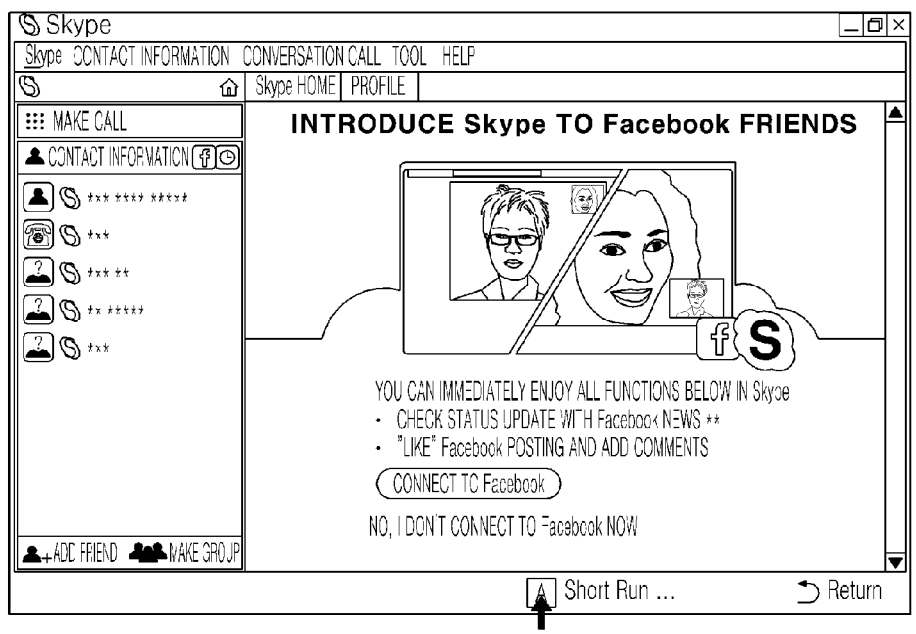
Figure 3D:
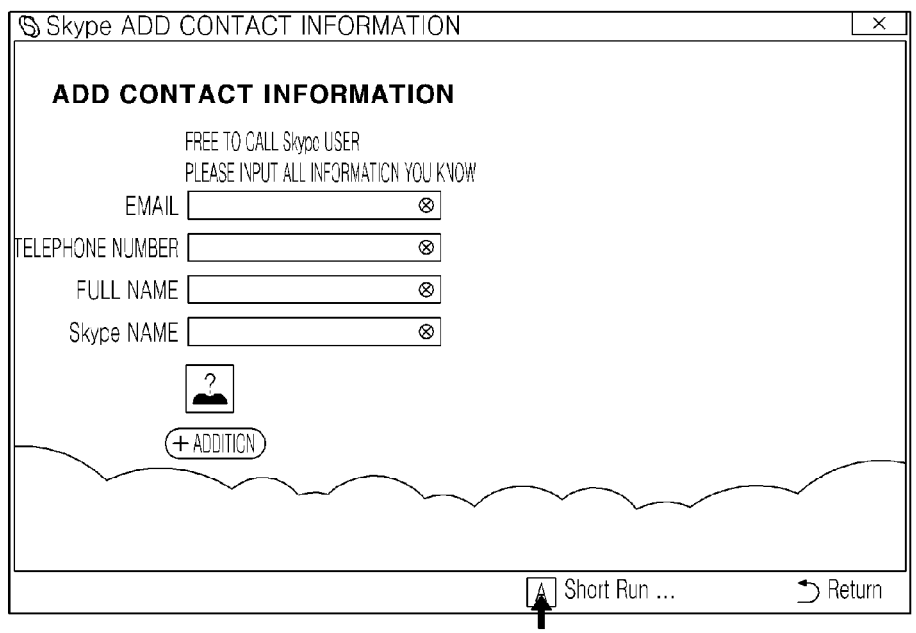

Based on the screen shown in FIG. 3C, if user input information for selecting the information A is not received, and user input information indicating additional friend selection is received, a screen displayed on the device 110 is changed from the screen shown in FIG. 3C to a screen shown in FIG. 3D on which contact information can be added.

Figure 3E:
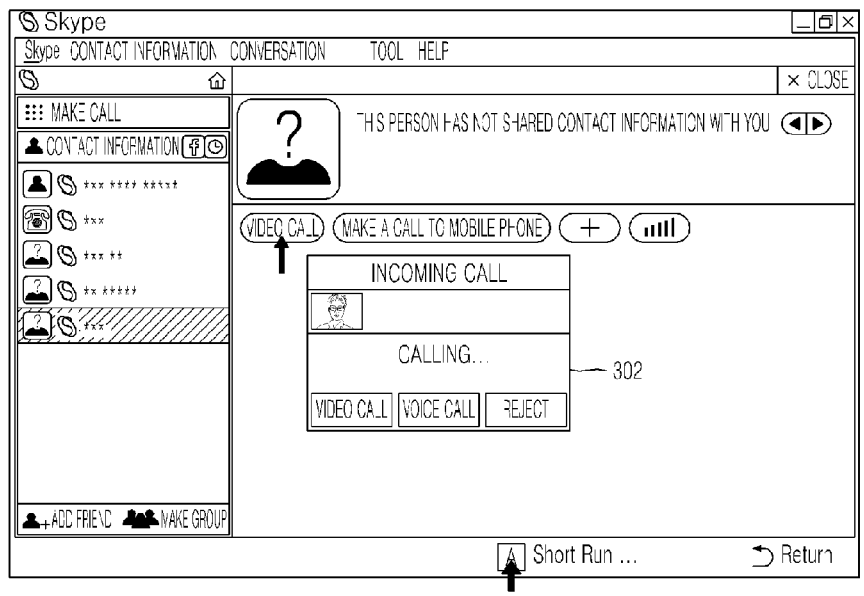

Based on the screen shown in FIG. 3D, if a mapping request signal using the information A is not received, and information on the other party including contact information of the other party is completely input, a screen displayed on the device 110 is changed from the screen shown in FIG. 3D to a screen shown in FIG. 3E.

Figure 3F:
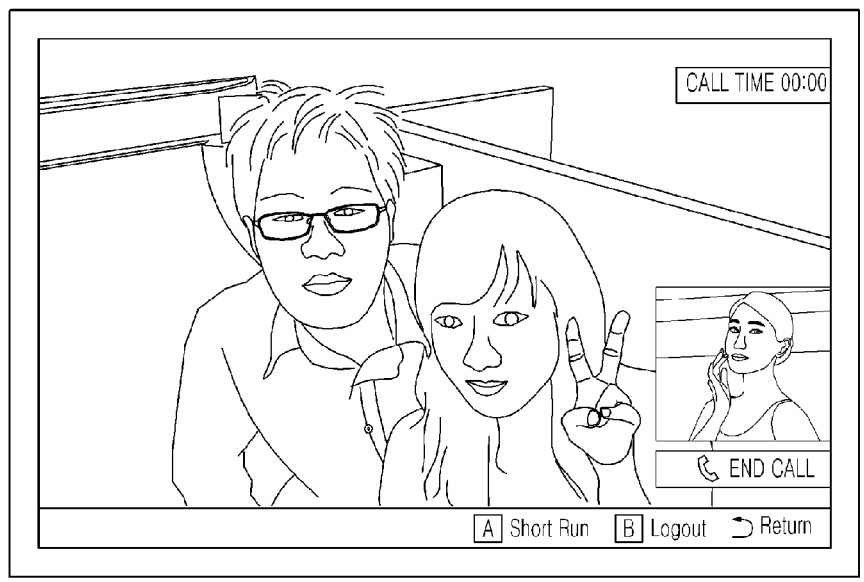

Based on the screen shown in FIG. 3E, if user input information for selecting a video call through the device 110 is received, a screen 302 indicating a state of trying a video call connection to a selected party is displayed on the screen shown in FIG. 3E in an overlap manner. Based on the screen shown in FIG. 3E with which the screen 302 is overlapped, if a mapping request signal using the information A is not received, and a video call is connected, a screen displayed on the device 110 is changed from the screen shown in FIG. 3E to a video call screen as shown in FIG. 3F, thereby displaying the video call screen.

As shown in FIGS. 3B to 3F, since the information A for inputting a mapping request signal is displayed on a screen being displayed on the device 110 while the application is being executed, the user of the device 110 may input a signal at any time for requesting a mapping between a short run indicator and application execution information by using the information A.

The information A for inputting a mapping request signal may be included in all execution screens of all applications executable in the device 110, but can be included only in screens on which an event based on user input information can be generated.

However, unlike in FIGS. 3B to 3F, a short run indicator mapping request signal may be input according to control of a menu selection key on the device 110. That is, a short run indicator mapping request signal may be input by displaying, on the device 110, a menu window including information for inputting the short run indicator mapping request signal. Alternatively, a dedicated button for mapping between a short run indicator and application execution information may be embedded on the device 110 so that the user can input a signal for requesting a mapping between a short run indicator and application execution information by using the dedicated button at any time while an application is being executed.

Referring back to FIG. 2, if a short run indicator mapping request signal is received in operation S202, the device 110 acquires application execution information in operation S203. The application execution information is acquired from the information stored according to the execution of the application, which has been described in operation S201. For example, when the screen shown in FIG. 3D is displayed, if a mapping request signal using the information A is received, the device 110 acquires application execution information from the information stored according to the execution of the application. The acquiring the application execution information may be referred to as detecting the application execution information.

The application execution information is information capable of automatically executing the application up to the procedure shown in FIG. 3D while executing the Skype application. Thus, the acquired application execution information may include, for example, identification information for the Skype application, the login information input in FIG. 3B, the user input information indicating additional friend selection, which is input in FIG. 3C, the information on the other party including contact information, which is input in FIG. 3D, and mapping request time point information.

In FIG. 3D, if a mapping request signal is received in a state where no contact information has been input, the application execution information may include identification information (e.g., time point information or page information for displaying a contact information input screen when executing the application) or mapping request time point information of the screen shown in FIG. 3D, but may not include information on the other party.

A criterion for acquiring application execution information from the information stored in the device 110 may be set in advance in the device 110 for each application or for each screen included in each application, but is not limited thereto. That is, a criterion for acquiring application execution information may vary in a Skype application and a health application.

For example, in the Skype application, the criterion may be set so that application execution information is acquired based on an application executed by the device 110. However, in the health application, the criterion may be set so that application execution information includes not only information based on an application executed by the device 110, but also execution and setting information of an external device (for example, a blood pressure meter or a blood glucose meter) linked to the device 110. In addition, the acquisition of the application execution information may be performed in operation S201.

If the application being executed is a fitness application, and a signal for requesting a mapping between a short run indicator and application execution information is received after the user sets a desired fitness condition, the acquired application execution information is information for automatically executing the application up to fitness condition setting from the execution start of the fitness application. Thus, the acquired application execution information may include user input information and application operation information up to fitness condition setting from the execution start of the fitness application. The user input information may include login information for the fitness application and profile information of the user. If the login information is not necessary when the fitness application is executed, the user input information does not include the login information. The profile information may include information including name, sex, birth date, height, weight, and so forth of the user. The application operation information may include identification information for the fitness application and screen identification information provided in each operation.

FIGS. 4A to 4E illustrate screens for describing the method of executing an application, according to another exemplary embodiment, wherein the application is a fitness application.

Screens according to a process of executing the fitness application may vary according to a type of the device 110 as described with respect to the Skype application. In addition, when user input information selects another menu item, another screen may be provided. Thus, the screens according to a process of executing the fitness application are not to be limited to those shown in FIGS. 4A to 4E.

Figure 4A:
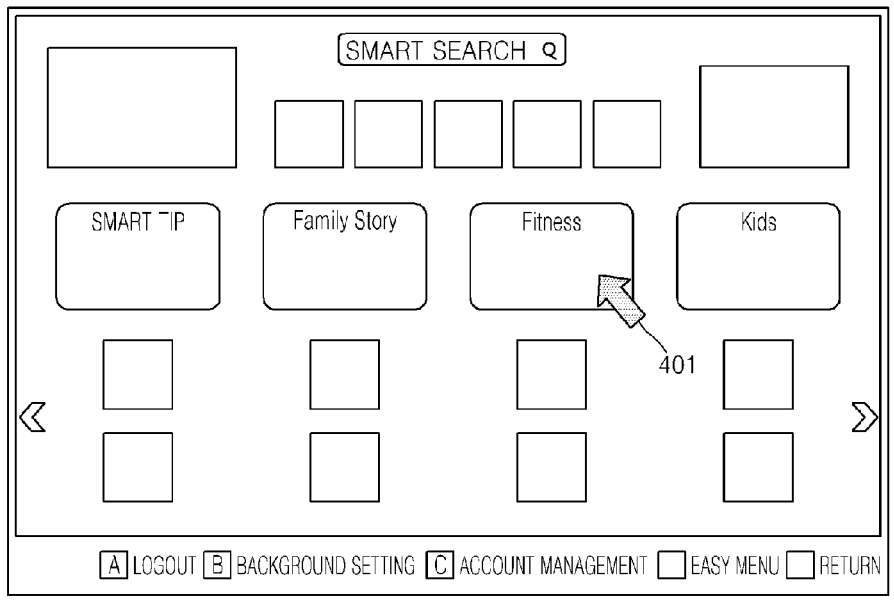
FIGS. 4A to 4E illustrate screens for describing the method of executing an application, according to another exemplary embodiment.

FIG. 4A illustrates a screen on which an icon (Fitness) of a fitness application is selected from among icons of various applications. When icons of various applications as shown in FIG. 4A are displayed on the device 110, if a user input for placing a pointer 401 on the icon of the fitness application is received, and a user input for selecting the icon of the fitness application is received, the device 110 executes the fitness application. Accordingly, the device 110 displays an initial screen of the fitness application as shown in FIG. 4B.

Figure 4B:
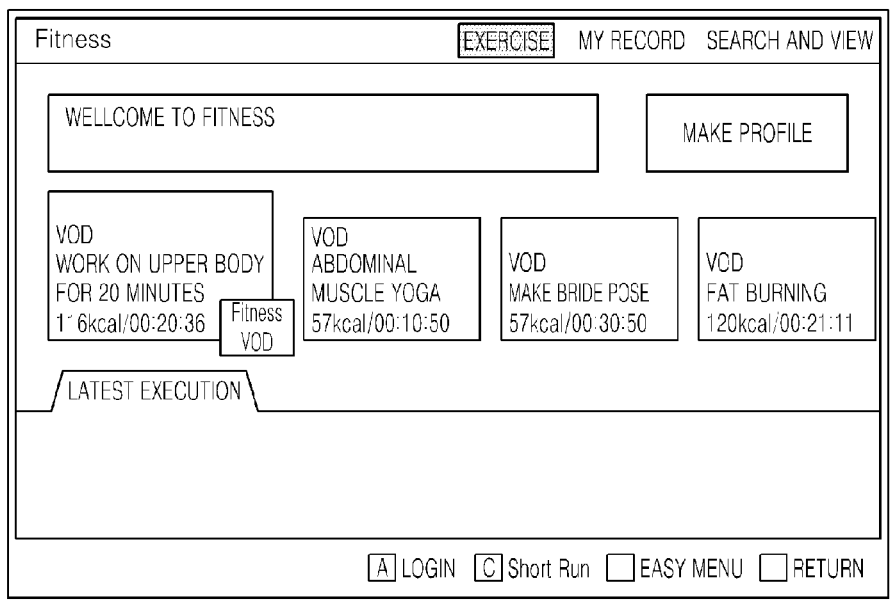

Referring to FIG. 4B, information C for requesting a mapping between a short run indicator and application execution information is displayed on the bottom of the screen. Information for requesting a mapping is not limited to information C. The user may input a signal for requesting a mapping between a short run indicator and application execution information by using the information C for requesting a short run indicator mapping.

Figure 4C:
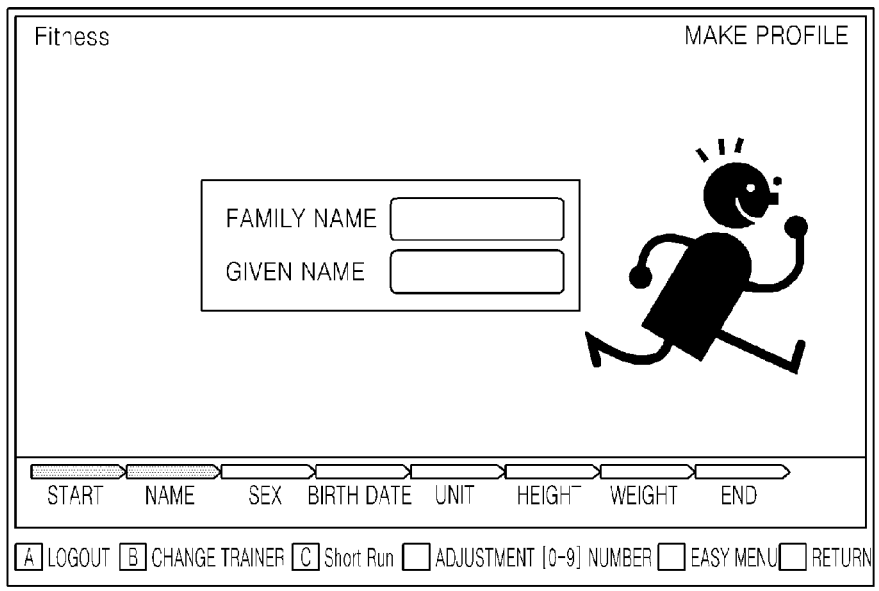

Based on the screen shown in FIG. 4B, if a signal for requesting a mapping between a short run indicator and application execution information by using the information C is not received, and profile edit selection information is received, a screen displayed on the device 110 is changed from the screen shown in FIG. 4B to a screen shown in FIG. 4C. The information C for requesting a short run indicator mapping is also displayed on the bottom of the screen shown in FIG. 4C. The display of the information C for requesting a mapping indicates that short run can be set on a corresponding screen. A displayed location of the information C is not limited to the bottom of a screen as shown in FIG. 4C.

Figure 4D:
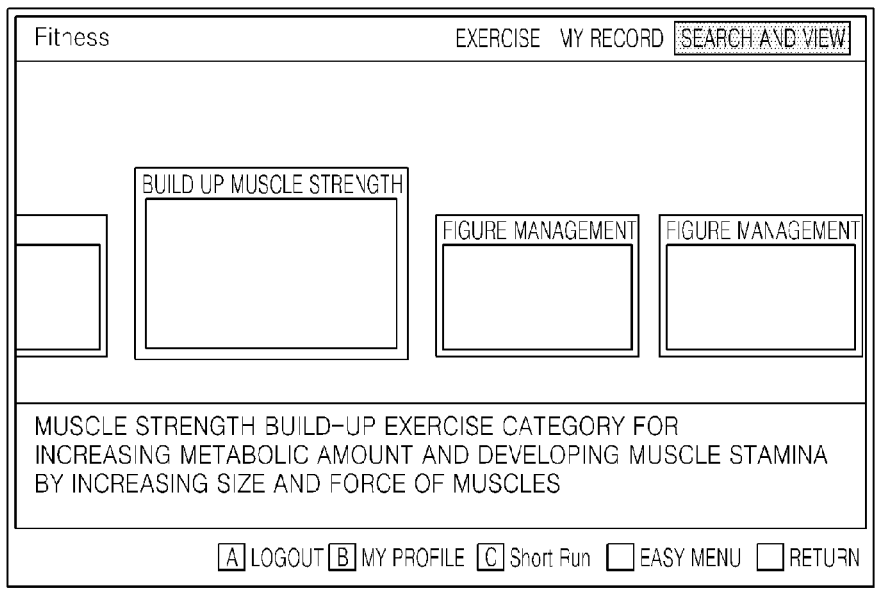

Based on the screen shown in FIG. 4C, if user input information for selecting the information C is not received, profile information is completely input, and information for selecting "search and view" from among menu items on the top of the screen is input after returning to the screen shown in FIG. 4B, the device 110 displays a screen including fitness item information selectable by the user as shown in FIG. 4D.

Figure 4E:
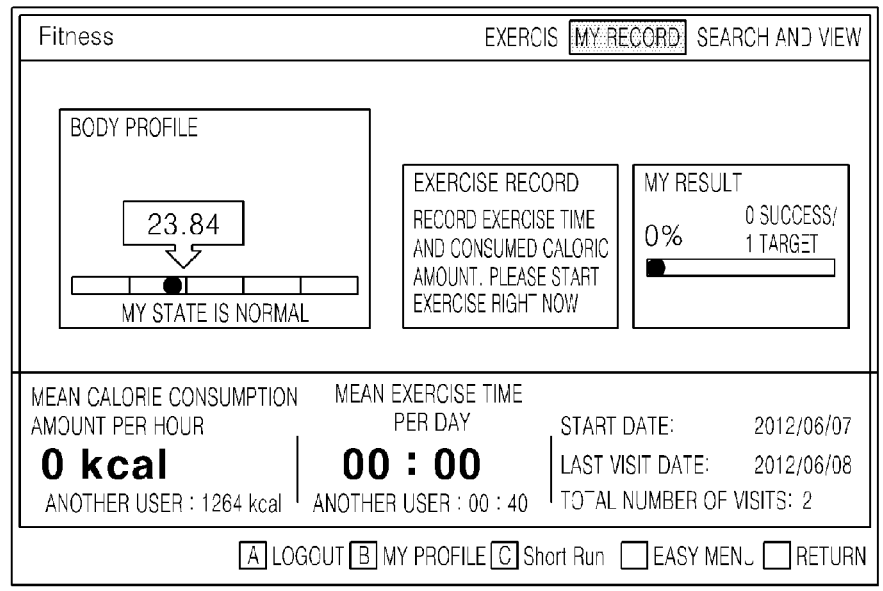

Based on the screen shown in FIG. 4D, if a user input for selecting the information C is not received, and an item "my record" is selected from the menu on the top, the device 110 displays the user's record information screen as shown in FIG. 4E. The user input for selecting the information C may be defined in various forms as described with respect to the user input information.

As shown in FIGS. 4B to 4E, since the information C for requesting a short run indicator mapping is continuously displayed on a screen being displayed on the device 110 while the application is being executed, the user of the device 110 may input a signal at any time for requesting a mapping between a short run indicator and application execution information by using the information C.

However, unlike in FIGS. 4B to 4E, a separate menu window including information for inputting a signal for requesting a mapping between a short run indicator and application execution information according to a menu selection key control may be displayed on the device 110 and input the signal for requesting a mapping between a short run indicator and application execution information based on the menu window. Alternatively, a dedicated button may be embedded for short run indicator mapping on the device 110 so that the user can request for mapping between a short run indicator and application execution information by using the dedicated button at any time while an application is being executed.

If a short run indicator mapping request signal is received in operation S202 while the screen shown in FIG. 4D is being displayed on the device 110, the device 110 acquires application execution information up until the start of a process of displaying the screen shown in FIG. 4D after executing the fitness application in operation S203. The acquired application execution information is information capable of automatically executing the application until the screen shown in FIG. 4D is displayed due to the start of the execution of the fitness application. That is, the acquired application execution information may include information input by the user and application operation information until the screen shown in FIG. 4D is displayed, due to the start of the execution of the fitness application. The application operation information includes screen information displayed on the device 110 according to the application execution and identification of the fitness application. When the fitness application is being executed, if an external device (not shown) is connected to the device 110, and execution information and setting information of the connected external device are collected by the device 110, the application execution information may include the execution information and setting information of the external device.

FIGS. 5A to 5D illustrate screens for describing the method of executing an application, according to another exemplary embodiment, wherein the application is a Facebook application.

Screens according to a process of executing the Facebook application may vary according to a type of the device 110 as described with respect to the Skype application. Thus, the screens according to a process of executing the Facebook application are not to be limited to those shown in FIGS. 5A to 5D.

Figure 5A:
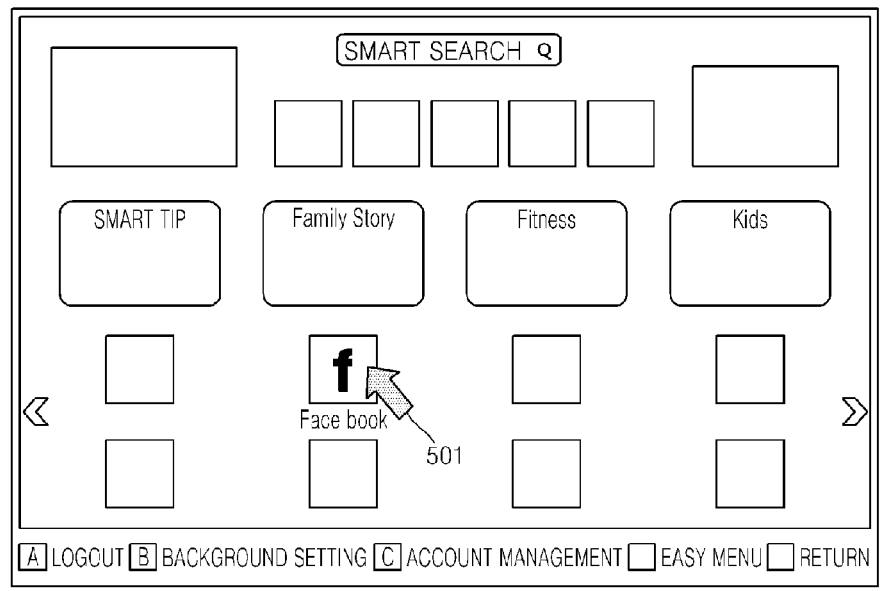
FIGS. 5A to 5D illustrate screens for describing the method of executing an application, according to another exemplary embodiment.

FIG. 5A illustrates a screen on which an icon of the Facebook application is selected from among icons of various applications. When icons of various applications as shown in FIG. 5A are displayed on the device 110, if user input information for placing a pointer 501 on the icon of the Facebook application is received, and user input information for selecting the icon of the Facebook application is received, the device 110 executes the Facebook application. Accordingly, the device 110 displays a screen for inputting Facebook login information as shown in FIG. 5B.

Figure 5B:
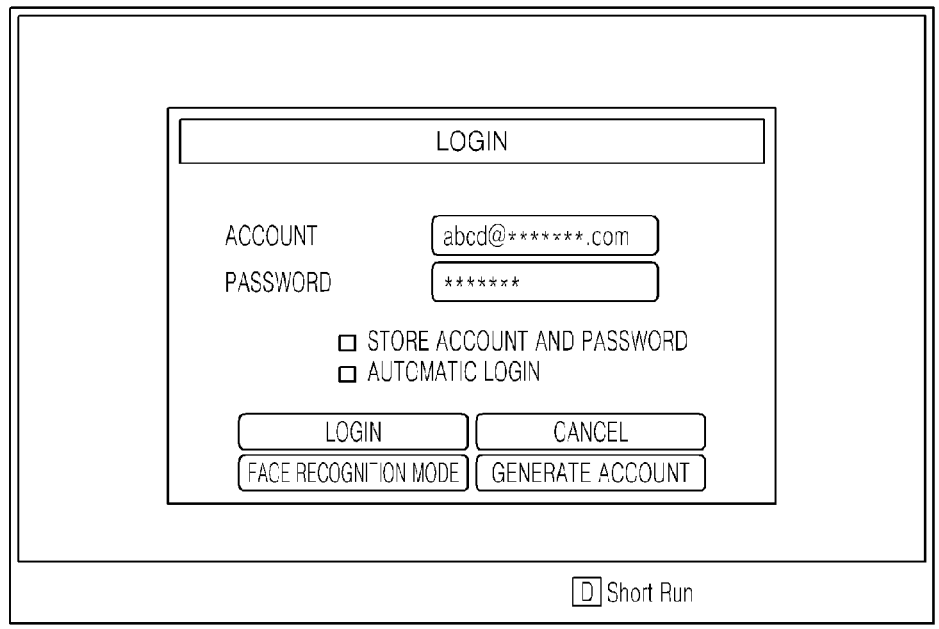

Referring to FIG. 5B, information D for requesting a mapping between a short run indicator and application execution information is also displayed on the bottom of the screen. Information for requesting a mapping between a short run indicator and application execution information is not limited to information D. The user may input a signal for requesting a mapping between a short run indicator and application execution information by using the information D a requesting for short run indicator mapping.

Figure 5C:
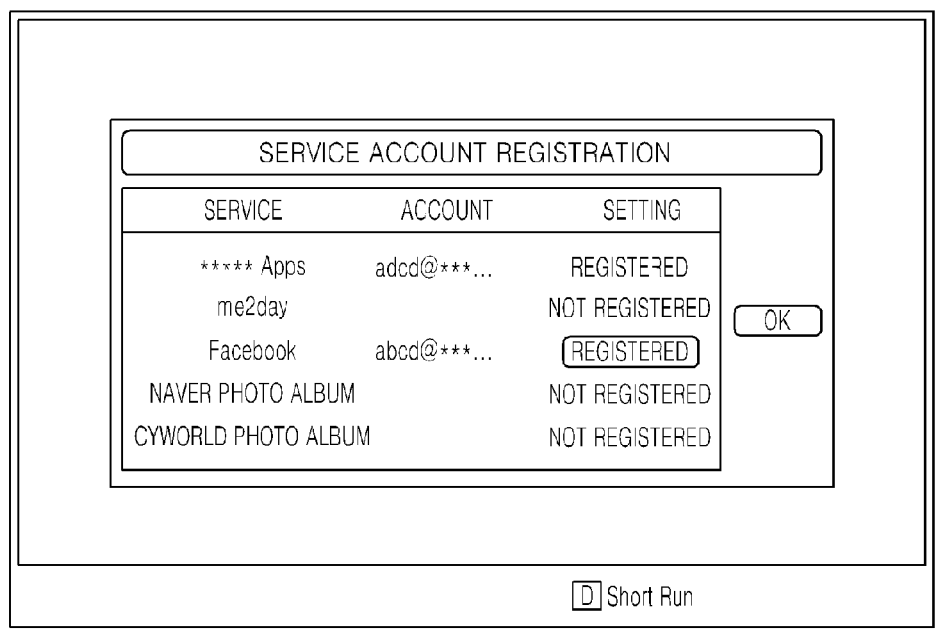

Based on the screen shown in FIG. 5B, if user input information for selecting the information D is not received, and login information is received, a screen for confirming input account registration when the Facebook application is executed is displayed on the device 110 as shown in FIG. 5C. The information D for requesting a short run indicator mapping is also displayed on the bottom of the screen shown in FIG. 5C.

Figure 5D:
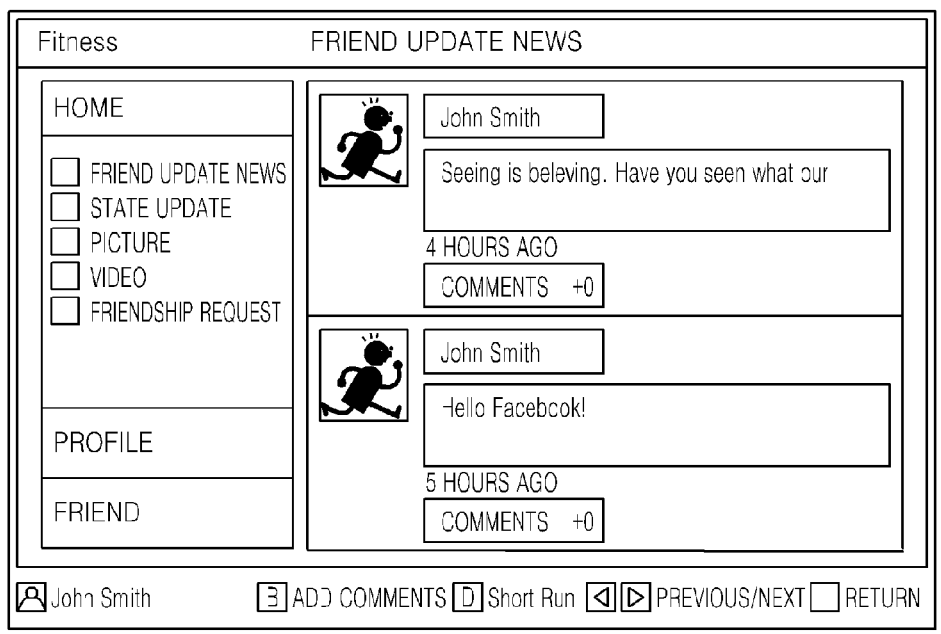

Based on the screen shown in FIG. 5C, if user input information for selecting the information D is not received, and user input information for selecting "OK" is received, a screen shown in FIG. 5D is displayed on the device 110.

As shown in FIGS. 5B to 5D, since the information D for requesting a mapping between a short run indicator and application execution information is continuously displayed on a screen being displayed on the device 110 while the application is being executed, the user of the device 110 may input a signal at any time for requesting a mapping between a short run indicator and application execution information by using the information D.

However, unlike in FIGS. 5B to 5D, a separate menu window including information for inputting a short run indicator mapping signal according to a menu selection key control may be displayed on the device 110 and input the short run indicator mapping signal based on the menu window. Alternatively, a dedicated button may be embedded for short run indicator mapping on the device 110 so that the user can a short run indicator mapping request signal by using the dedicated button at any time while an application is being executed.

For example, if the short run indicator mapping request signal in operation S202 is received in the procedure shown in FIG. 5D, the device 110 starts execution of the Facebook application and acquires application execution information up until the start of a process of displaying the screen shown in FIG. 5D after executing the Facebook application in operation S203. The acquired application execution information is information capable of automatically executing the application until the screen shown in FIG. 5D is displayed due to the start of the execution of the Facebook application. That is, the acquired application execution information may include user input information and application operation information until the screen shown in FIG. 5D is displayed, due to the start of the execution of the Facebook application. The application operation information includes screen information generated according to the application execution, application identification information, and login information.

Referring back to FIG. 2, in operation S204, the device 110 maps the acquired application execution information and a short run indicator. Only one short run indicator may be allocated to each application, but a different short run indicator may be allocated according to each execution operation of each application. In the mapping, the short run indicator may be displayed on the device 110.

FIG. 6A illustrates a different short run indicator according to each application execution operation in a Skype application. FIG. 6A illustrates short run indicators based on an application execution process. That is, "S login" of FIG. 6A is an example of a short run indicator which may be provided when a short run indicator mapping request signal is received in the login process of the Skype application shown in FIG. 3B. "S contact information addition" is an example of a short run indicator which may be provided when a short run indicator mapping request signal is received in the contact information addition process of the Skype application shown in FIG. 3D. "S personal A" is an example of a short run indicator which may be provided when a short run indicator mapping request signal is received while trying to establish a Skype video call connection shown in FIG. 3E.

The short run indicators shown in FIG. 6A may be understood as information detected based on a screen of an application being executed when a short run indicator mapping request signal is received. However, the short run indicators may each be provided in a summarized image form on each application execution screen. The short run indicators shown in FIG. 6A may be displayed as pop-up windows on the device 110 based on application execution information after the application execution information is acquired.

FIG. 6B illustrates short run indicators provided for each application. In mapping with application execution information, short run indicators may be displayed as a pop-up window on the device 110 as shown in FIG. 6B. When one of a plurality of pieces of numeric information of FIG. 6B displayed on the device 110 is selected, the selected numeric information is mapped to application execution information. The numeric information shown in FIG. 6B may be vacant channel information when the device 110 is a smart TV. The vacant channel information may be previously set for each application type and provided as described above. The short run indicators are not limited to those shown in FIGS. 6A and 6B.

When a short run indicator mapping request signal is received in FIG. 3D, and short run indicators are provided as shown in FIG. 6A or 6B, information on mapping between a short run indicator and application execution information may be defined as shown in FIG. 6C. That is, identification information of the short run indicator "S contact information addition" is mapped to application execution information, which includes Skype application identification information for automatically executing from icon control of the Skype application up to an operation of displaying a contact information addition screen of the Skype application, login information, and S contact information screen location information (execution time point information), and application execution information, which includes short run indicator information (or short run indicator identification information). Application execution information of FIG. 6C may be stored in the device 110 as a macro or an interface description language (IDL) based on the mapped short run indicator. Application execution information may be referred to as execution information of a lower function of an application.

Figure 6D:
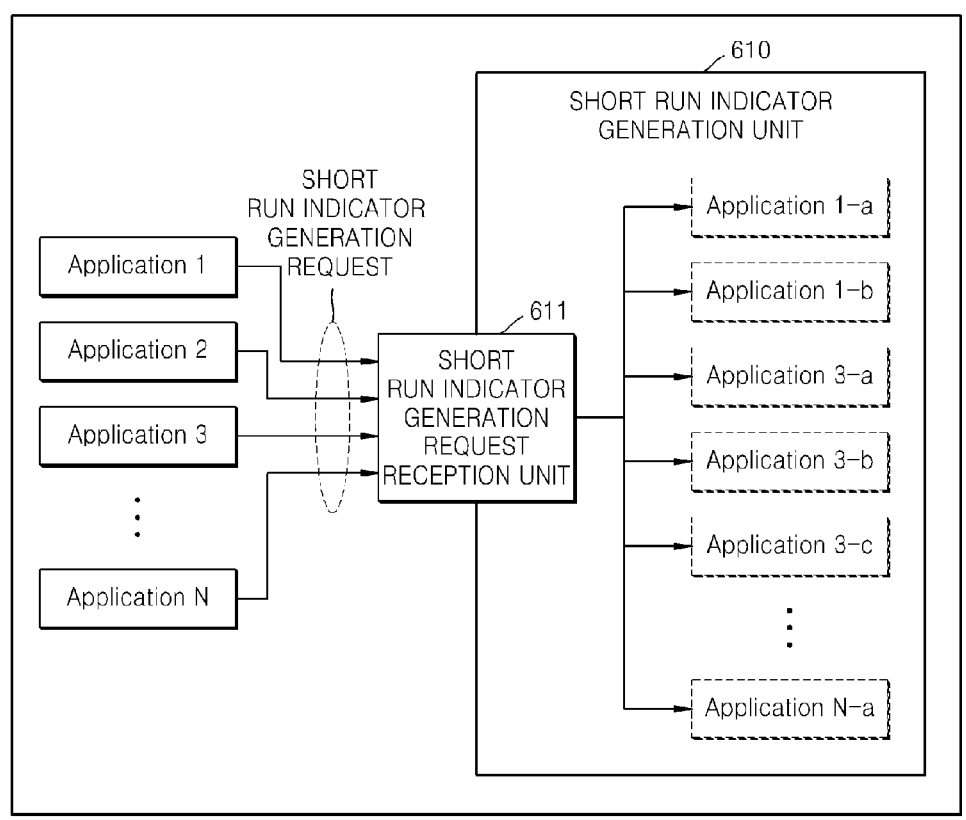

FIG. 6D is a block diagram for describing a process of generating short run indicators for each application according to a short run indicator generation request in the method of executing an application according to an exemplary embodiment.

Referring to FIG. 6D, short run indicator generation may be requested in each of N applications. The N applications are installed in the device 110 or executable by the device 110 via communication between the device 110 and the server 130. A time at which short run indicator generation can be requested in each of N applications is when an application is being executed by the device as described with respect to operation S201 of FIG. 2 or when a mapping request signal is received after execution of an application by the device 110 ends as in FIG. 14 to be described below, but is not limited thereto.

When a short run indicator generation request is received through a short run indicator generation request reception unit 611, a short run indicator generation unit 610 may generate a preset short run indicator. In this case, components Application 1-a, Application 1-b, Application 3-a, Application 3-b, Application 3-c, . . . , Application N-a, which are included in the short run indicator generation unit 610 and are indicated by dashed lines, are preset short run indicators for stages of the N applications.

For example, the short run indicators Applications 1-a and Applications 1-b are preset short run indicators of an application 1. The short run indicators Applications 1-a and Applications 1-b are preset according to execution stages of the application 1. That is, the short run indicators Applications 1-a and Applications 1-b are short run indicators set to be used in different execution stages of the application 1.

The short run indicators Application 3-a, Application 3-b, and Application 3-c short run indicators set to be used in different execution stages of an application 3. The short run indicator Application N-a is a short run indicator to be used in an application N.

Although not shown in FIG. 6D, the short run indicator generation unit 610 is considered to also generate short run indicators of applications except for the applications 1, 3 and N.

However, the short run indicators Application 1-a, Application 1-b, Application 3-a, Application 3-b, Application 3-c, . . . , Application N-a may be referred to as short run indicators selected by user input information in an operation of executing a corresponding application from among selectable short run indicators displayed on the device 110.

In a case as shown in FIG. 6D, information on mapping between application execution information and a short run indicator includes, for example, short run indicator identification information, identification information for a Skype application, login information (ID and password) of the Skype application, information on the other party (name, email, and Skype name), and short run indicator generation request time point information when an application is the Skype application, but is not limited thereto.

One piece of numeric information for each application may be applied to a short run indicator. In this case, only one short run can be set for one application. For example, when a short run indicator of the Skype application is set as numeric information "300", if short run is set by receiving a mapping request after logging-in to the Skype application, every time the numeric information "300" is input through the device 110, the device 110 may automatically execute up to a login process of the Skype application.

However, if short run is set by inputting the mapping request while trying to initiate a call to the person A, during a call, or after completing the call following the execution of the Skype application, a short run setting of the Skype application in the device 110 is updated from the post-login process to a process of trying to call the person A. Thus, every time numeric information "300" is input through the device 110, the device 110 may automatically execute up to the process of trying to call the person A.

Referring back to FIG. 2, in operation S205, information on the mapping can be stored only in the device 110. However, in operations S206 and S207, the mapping information can be stored in the device 110 and the server 130 or stored only in the server 130.

Figure 7:
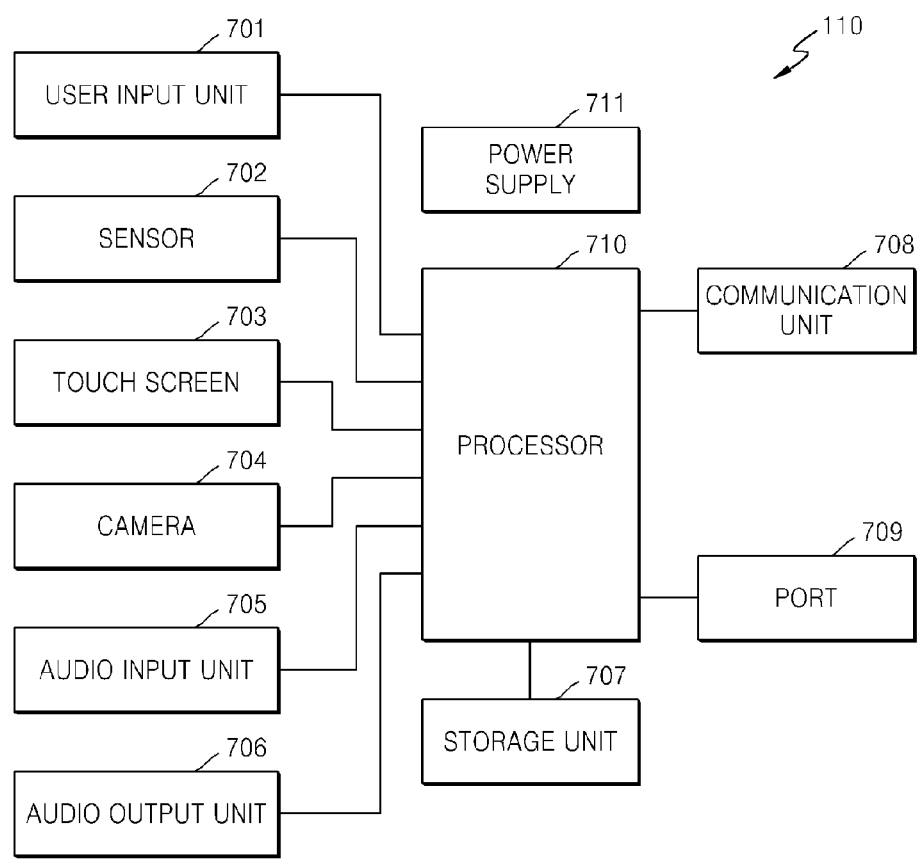
FIG. 7 is a block diagram of a device in the system of FIG. 1, according to an exemplary embodiment.

FIG. 7 is a block diagram of the device 110 shown in FIG. 1, according to an exemplary embodiment. Referring to FIG. 7, the device 110 includes a user input unit 701, a sensor 702, a touch screen 703, a camera 704, an audio input unit 705 (e.g., audio input), an audio output unit 706 (e.g., audio output), a storage unit 707 (e.g., storage), a communication unit 708 (e.g., communicator), a port 709, a processor 710, and a power supply 711. However, the configuration of the device 110 is not limited to that shown in FIG. 7.

The user input unit 701 generates input data (or control data) for controlling an operation of the device 110 or user input information as described above. The user input unit 701 may include at least one of a keypad, a dome switch, a touch pad which can be used instead of a mouse, a jog wheel, a jog switch, a hardware button, and the like.

The sensor 702 generates a sensing signal for controlling an operation of the device 110 by sensing a current state of the device 110, such as a location of the device 110, user contact or not, orientation of the device 110, speed increase or decrease of the device 110, and the like. The sensor 702 may include a proximity sensor and the motion sensor described above. Thus, the sensor 702 may generate a signal obtained by recognizing a sensor-based user gesture.

The proximity sensor is a sensor for detecting the presence or absence of an object approaching a preset detection surface or the presence or absence of an object existing nearby by using a force of an electromagnetic field or infrared rays without a mechanical contact. Examples of the proximity sensor are a transmissive photoelectric sensor, a direct reflective photoelectric sensor, a mirror reflective photoelectric sensor, a high-frequency oscillation type proximity sensor, a capacitive proximity sensor, a magnetic proximity sensor, an infrared proximity sensor, and the like.

User input information based on the touch screen 703 may be generated according to a user request or user selection depending on a gesture of the user as described above. The user gesture may be variously defined as the user gesture examples described above by various combinations of the number of touches, a touch pattern, a touch area, and touch strength. It may be understood that a touch based on a finger of the user on the touch screen 703 is based on a body part of the user which can touch a touch region of the touch screen 703.

In addition, the touch screen 703 may include various sensors for sensing a touch or a proximity-touch on the touch screen 703. The sensors included in the touch screen 703 indicate sensors for sensing a gesture or pattern of the user on the touch screen 703. Thus, the touch screen 703 may generate a signal obtained by sensing at least one of a touch-based drag, flick, tap, touch and hold, double tap, panning, sweep, swipe, or the like as described above or a user gesture or pattern based on a proximity sensor. The proximity sensor for the touch screen 703 may be the same as the proximity sensor included in the sensor 702.

An example of the sensors for sensing a touch input on the touch screen 703 is a tactile sensor. The tactile sensor may sense various kinds of information, such as roughness of a contact surface, hardness of a contact object, a temperature of a contact point, and the like. A touch input on the touch screen 703 indicates a case where a pointer touches a panel. The touch input may be a multi-touch input. A proximity-touch on the touch screen 703 indicates a case where the pointer approaches within a predetermined distance from the touch screen 703 without actually touching the touch screen 703. The pointer is a tool for touching or proximity-touching a specific part of the touch screen 703. Examples of the pointer are a stylus pen, a finger, a body part of the human being, which corresponds to a finger, or a tool corresponding to a finger, and the like. Thus, the pointer may be referred to as an external input device.

The touch screen 703 outputs information processed by the device 110. For example, the touch screen 703 displays a screen responding to a user gesture or a touch pattern sensed by the sensors included in the touch screen 703, control data or user input information input through the user input unit 701, or a signal sensed by the sensor 702.

The touch screen 703 may be referred to as an input and output device. When the touch screen 703 is an input and output device, a screen displayed on the touch screen 703 includes a user interface (UI) screen or a graphic user interface (GUI) screen. The touch screen 703 may display screens as shown in FIGS. 3A to 3F, FIGS. 4A to 4E, and FIGS. 5A to 5D, display short run indicators as shown in FIG. 6A or 6B, and receive user input information.

The touch screen 703 may be a liquid crystal display (LCD), a thin film transistor-LCD (TFT-LCD), an organic light-emitting diode (OLED), a flexible display, a three-dimensional (3D) display, an active-matrix OLED (AMOLED), or the like, but is not limited thereto. The touch screen 703 may be referred to as a display. The touch screen 703 may exist two or more in number according to an implementation form of the device 110.

The camera 704 processes an image frame of a still image, a video or the like, which is obtained by an image sensor (or a photo sensor) in a video call mode or a capturing mode. The processed image frame may be displayed on the touch screen 703. The image frame processed by the camera 704 may be stored in the storage unit 707 or transmitted to the outside through the communication unit 708 or the port 709.

The camera 704 may exist two or more in number according to a configuration of the device 110. In addition, the camera 704 may be used as an input device for recognizing a spatial gesture of the user. The image frame obtained by the camera 704 may be an image including a face of the user of the device 110 when a video call is executed in a Skype application. In addition, the image frame may be a facial image for user authentication of the device 110.

The audio input unit 705 receives an external acoustic signal in a call mode, a recording mode, or a voice recognition mode, converts the external acoustic signal to electrical voice data, and transmits the electrical voice data to the processor 710. The audio input unit 705 may include, for example, a microphone. The audio input unit 705 may include various noise removing algorithms for removing noise generated in a process of receiving the external acoustic signal.

An acoustic signal input using the audio input unit 705 may be user input information based on a spoken language. For example, a short run indicator mapping request command may be input through the audio input unit 705. The acoustic signal that is user input information based on a spoken language indicates user input information based on voice recognition. The external acoustic signal input through the audio input unit 705 may be stored in the storage unit 707 or transmitted to the outside through the communication unit 708 or the port 709.

The user input unit 701, the sensor 702, the touch screen 703, the camera 704, and the audio input unit 705 may be referred to as an information input unit or an information input and output unit according to an interface function between the device 110 and the user. For example, when a UI function between the device 110 and the user includes a touch recognition function, a voice recognition function, and a space gesture recognition function, the user input unit 701, the sensor 702, the camera 704, and the audio input unit 705 may be referred to as an information input unit, and the touch screen 703 may be referred to as an information input and output unit.

The audio output unit 706 outputs an acoustic signal or an audio signal received from the outside in the call mode, an audio reproduction mode, or the like. The audio output unit 706 may include a speaker. If an audio signal is generated when an application is executed, the audio output unit 706 outputs the generated audio signal. The audio input unit 705 and the audio output unit 706 may be configured in one body, such as a headset.

The storage unit 707 stores at least one program and/or instruction set and resources, which are configured to be executable in the processor 710 to be described below. The at least one program includes at least one program necessary to execute the application executing method according to an exemplary embodiment, an operating system (OS) program of the device 110, application programs related to various functions to be performed by the device 110, and programs for operating hardware components included in the device 110.

The resources include reference information of information (or application execution information) which should be acquired when an application is executed to automatically execute the application according to an exemplary embodiment, user information of the device 110, information necessary to operate application programs set in the device 110, and information necessary to execute the programs required for operating the hardware components described above. The reference information may be set differently according to each application. For example, when an application is a Skype application, the reference information includes login information for the Skype application, information on the other party, which is used in a video call, and information capable of acquiring identification information on each execution process. When an application is an AllShare application, the reference information includes information on devices sharing content and information capable of acquiring information on a shared file, reproduction time point information, and the like.

The storage unit 707 may independently include a storage unit for storing the OS program and at least one program for operating each component included in the device 110 and a storage unit for storing at least one program and resource for executing the application executing method according to an exemplary embodiment and the application programs.

The storage unit 707 may include a nonvolatile memory, such as a high-speed random access memory (RAM), a magnetic disc storage device, or a flash memory, another nonvolatile memory, or a memory card, but is not limited thereto. Thus, the storage unit 707 may be referred to as a memory.

The at least one program and/or instruction set stored in the storage unit 707 may be classified into a plurality of modules according to functions.

Figure 8:
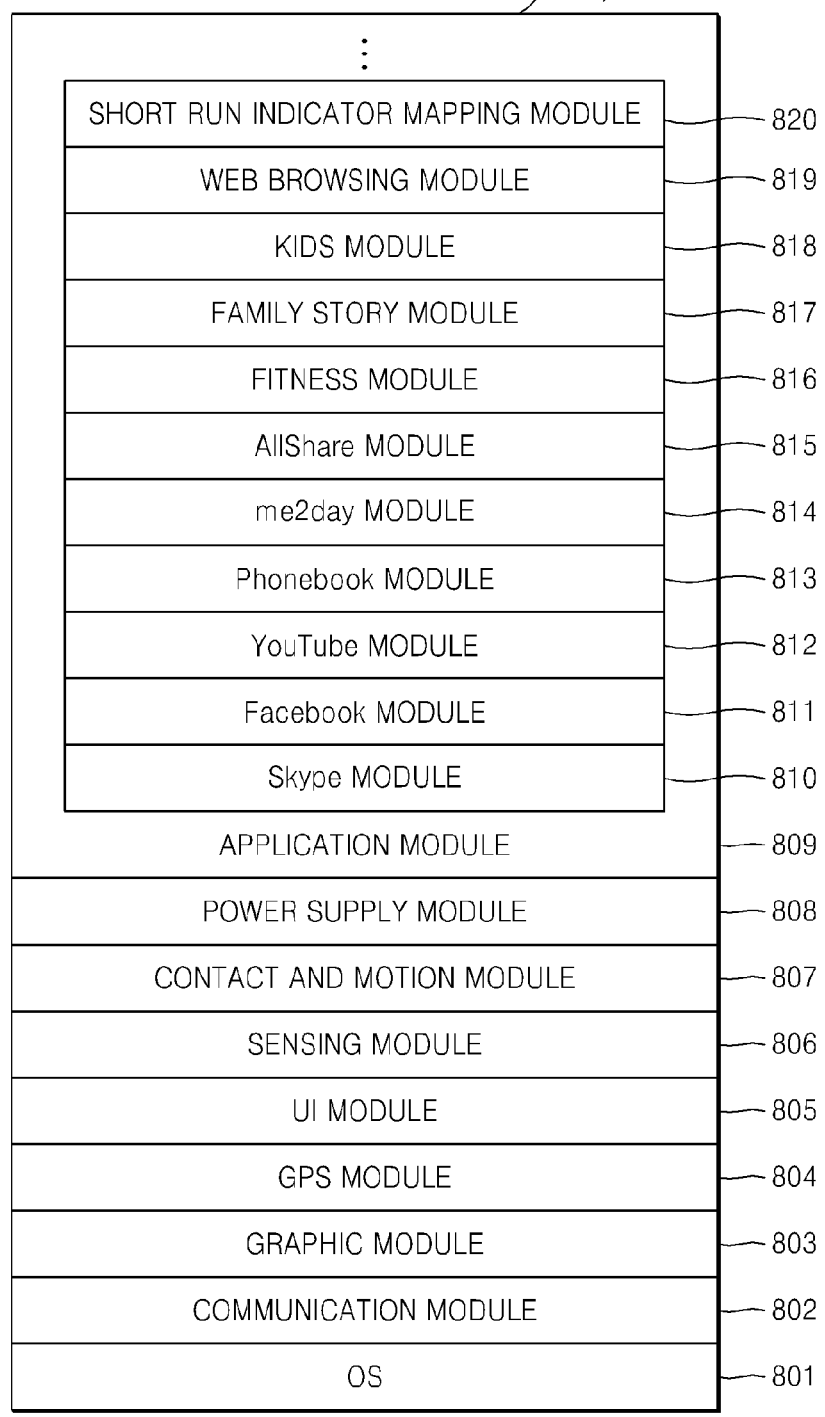
FIG. 8 illustrates a program and/or instruction set stored in a storage unit in the device of FIG. 7.

FIG. 8 shows an example in which a program and/or instruction set stored in the storage unit 707 is classified into modules. Referring to FIG. 8, the storage unit 707 includes an OS 801, a communication module 802, a graphic module 803, a global positioning system (GPS) module 804, a UI module 805, a sensing module 806, a contact and motion module 807, a power supply module 808, and an application module 809, but is not limited thereto.

The application module 809 includes a Skype module 810, a Facebook module 811, a YouTube module 812, a Phonebook module 813, a me2day module 814, an AllShare module 815, a fitness module 816, a family story module 817, a kid's module 818, a web browsing module 819, and a short run indicator mapping module 820, but is not limited thereto.

The OS 801 controls and manages a general function of the device 110 and includes a software component capable of communication between hardware and soft components.

The communication module 802 allows communication with the server 130 through the communication unit 708 and allows communication with the outside through the port 709. The communication module 802 includes a software component for processing data received from and transmitted to the server 130 through the communication unit 708. According to an exemplary embodiment, the communication module 802 includes a software component capable of bi-directional communication between the server 130 and the device 110 to store mapping information in the server 130, download an application stored in the server 130, or execute an application, which is stored in the server 130, in the device 110.

The graphic module 803 includes a software component for brightness adjustment and rendering of a graphic displayed on the touch screen 703 and a software component for providing a virtual keyboard (or a soft keyboard) to be used to input text in the application module 809.

The GPS module 804 includes a software component for determining a position of the device 110 and providing information on the determined position to an application which provides a position-based service.

The UI module 805 includes a software component for providing a UI required for an application which provides UI information based on the touch screen 703.

The sensing module 806 includes a software component for determining sensing information based on the sensor 702 and providing the determined sensing information to the application module 809 which provides a service based on the determined sensing information.

The contact and motion module 807 includes a software component for sensing a touch contact based on the touch screen 703, tracking a contact-based motion, and providing the contact-based motion to the application module 809 requiring the contact-based motion.

The power supply module 808 includes a software component for controlling power to be supplied to hardware components in the device 110 and controlling a power save mode for power to be supplied to the touch screen 703 by being linked to the OS 801.

Since it may be considered that functions of the modules included in the application module 809 would be intuitively understood by one of ordinary skill in the art based on the names of the modules, a description will be made of application modules related to exemplary embodiments.

For example, when the user of the device 110 inputs a request to display a screen including executable applications through the touch screen 703 as shown in FIG. 3A, the processor 710 displays a screen based on the modules included in the application module 809 on the touch screen 703 as shown in FIG. 3A.

If the Skype application is selected in FIG. 3A, the processor 710 executes the Skype application based on user information input through the touch screen 703 as shown in FIGS. 3B to 3F and displays screens according to the application execution on the touch screen 703. If a request for mapping between a short run indicator and application execution information based on a screen displayed on the touch screen 703 is received, the processor 710 executes the short run indicator mapping module 820 to map a short run indicator and acquired application execution information as described with reference to FIGS. 6A to 6D. The mapping information is stored in the storage unit 707 or stored in the server 130 through the communication unit 708 as described above.

The communication unit 708 may transmit and receive data to and from the server 130 through a wireless network, such as wireless Internet, wireless intranet, a wireless telephone network, wireless local area network (WLAN) communication, Wi-Fi communication, WFD communication, third generation (3G) communication, 4G communication, long term evolution (LTE) communication, Bluetooth communication, infrared data association (IrDA) communication, radio frequency identification (RFID) communication, ultra wideband (UWB) communication, ZigBee communication, or the like, or a wired network, such as wired Internet or a phoneline networking alliance (PNA). The network 120 of FIG. 1 may be defined as a wired network or a wireless network based on the communication unit 708.

The communication unit 708 may include at least one of a broadcast reception module, a mobile communication module, a wireless Internet module, a wired Internet module, a near distance communication module, and a position information module, but is not limited thereto.

The broadcast reception module receives a broadcast signal and/or broadcast related information from an external broadcast management server (not shown) through a broadcast channel. The broadcast channel may include a satellite channel, a terrestrial channel, and a cable channel. The mobile communication module transmits and receives a wireless signal to and from a base station (not shown) and the server 130 over a mobile communication network. The wireless signal may include various types of data according to transmission and reception of a voice call signal, a video call, or a text/multimedia message.

The wireless Internet module indicates a module for wireless Internet access. The wired Internet module indicates a module for wired Internet access. The near distance communication module indicates a module for near distance communication. As near distance communication technology, Bluetooth communication, RFID communication, IrDA communication, UWB communication, ZigBee communication, WFD communication, near field communication (NFC), or the like may be used.

The position information module indicates a module for checking or acquiring a position of the device 110, for example, a GPS-based position information module. The GPS-based position information module receives position information from a plurality of satellites. The position information may include coordinate information represented by latitude and longitude.

The port 709 may transmit and receive data to and from the outside by using a plug and play (PNP) interface such as a USB port (not shown). The PNP interface includes a module which automatically plays when an external device (not shown) is plugged into a plug of the device 110.

The power supply 711 supplies power to hardware components included in the device 110. The power supply 711 includes at least one power source, such as a battery and an alternating current power source. The device 110 may include a connection unit (not shown) connectable to an external power supply (not shown) instead of the power supply 711.

The processor 710 controls a general operation of the device 110 and may be referred to as at least one processor because the processor 710 may operate by being split into a plurality of processors according to a function of the device 110, although the processor 710 is shown as a single chip form in FIG. 1.

The processor 710 may generally control the user input unit 701, the sensor 702, the touch screen 703, the camera 704, the audio input unit 705, the audio output unit 706, the storage unit 707, the communication unit 708, the port 709, and the power supply 711 by using the OS 801 and the various modules 802 to 820 stored in the storage unit 707. Thus, the processor 710 may be referred to as a controller, a microprocessor, a digital signal processor (DSP), or the like. In addition, the processor 710 may provide a UI by using the user input unit 701, the sensor 702, the touch screen 703, the camera 704, and the audio input unit 705 with the OS 801 and the UI module 805.

The processor 710 may perform the signaling diagram shown in FIG. 2 by executing at least one program related to the application executing method according to an exemplary embodiment. The processor 710 may execute the program by reading the program from the storage unit 707 or downloading the program form the server 130 connected thereto through the communication unit 708.

The processor 710 executes at least one program related to the application executing method according to an exemplary embodiment, which is stored in the server 130. When the user requests for short run indicator mapping, the processor 710 requests that the server 130 acquires application execution information. Upon receiving the application execution information acquired by the server 130, the processor 710 may operate to map the received application execution information and a short run indicator and transmit mapping information to the server 130 so that the mapping information is stored in the server 130.

The acquired application execution information includes screen information generated according to execution of an application from an execution initial state of the application up to a reception time point of a mapping request signal, user input information, and application identification information. The user input information may include login information for the application and information input according to an operational characteristic of the application. In a case of a Skype application, the information input according to an operational characteristic of the application may include information regarding the other party for a call and login information as described with reference to FIGS. 3A to 3F. In a case of a fitness application, the information input according to an operational characteristic of the application may include user profile information and login information as described with reference to FIGS. 4A to 4E. In a case of a Facebook application, the information input according to an operational characteristic of the application may include Facebook login information as described with reference to FIGS. 5A to 5D. If a corresponding application does not require login information, the information input according to an operational characteristic of the application does not include login information. It may be understood that the processor 710 includes an interface function unit between various kinds of hardware components included in the device 110 and the processor 710.

Figure 9:
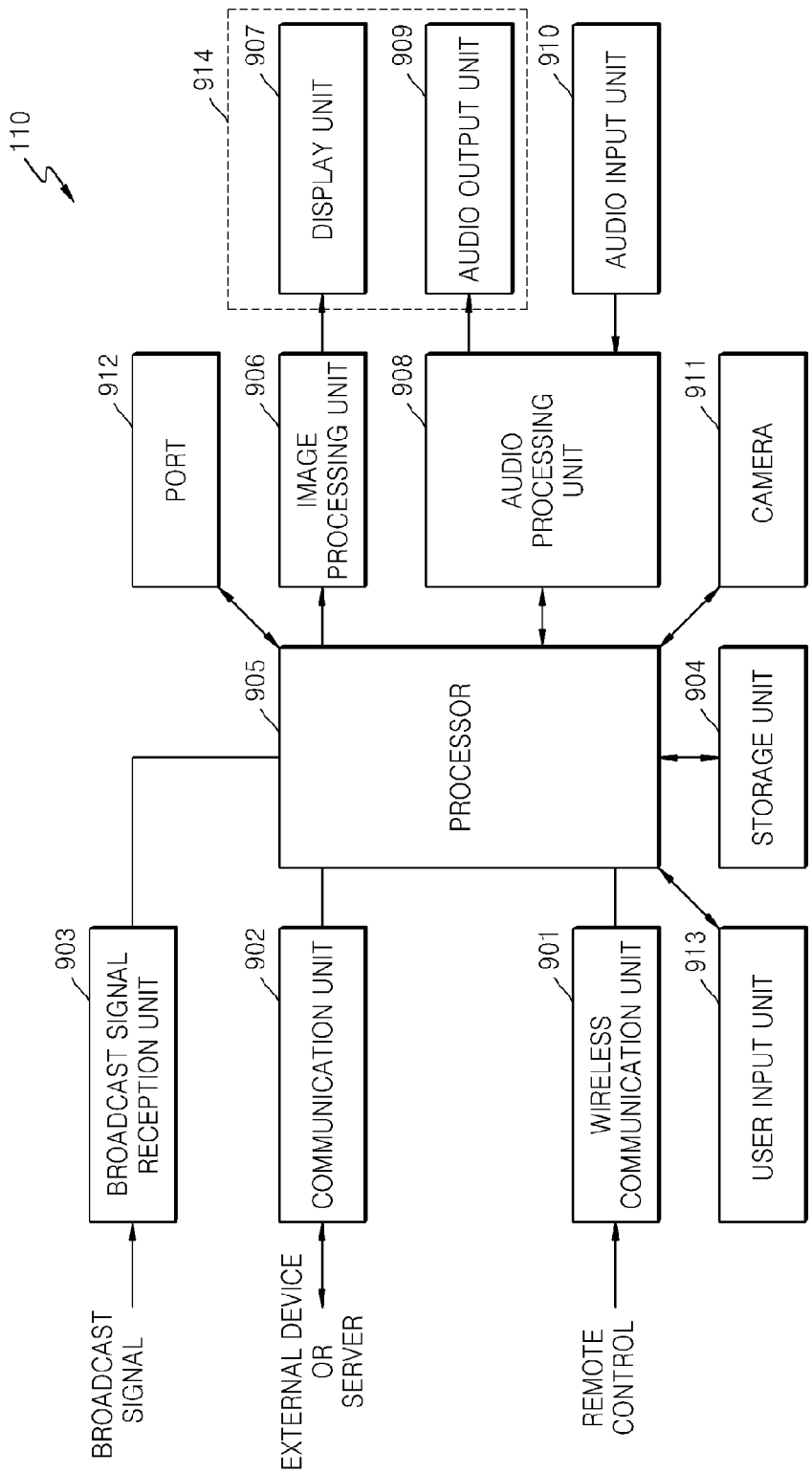
FIG. 9 is a block diagram of a device in the system of FIG. 1, according to another exemplary embodiment.

FIG. 9 is a block diagram of the device 110 of FIG. 1, according to another exemplary embodiment, wherein the device 110 is a smart TV having a communication function.

Referring to FIG. 9, the device 110 includes a wireless communication unit 901 (e.g., a wireless communicator), a communication unit 902, a broadcast signal reception unit 903 (e.g., a broadcast signal receiver), a storage unit 904, a processor 905, an image processing unit 906 (e.g., an image processor), a display unit 907 (e.g., a display), an audio processing unit 908 (e.g., an audio processor), an audio output unit 909, an audio input unit 910, a camera 911, a port 912, and a user input unit 913, but is not limited thereto.

The wireless communication unit 901 is configured to communicate with a remote control (not shown) in a wireless manner. That is, if the remote control includes an infrared (IR) transmitter, the wireless communication unit 901 includes an IR receiver to receive an IR signal transmitted from the remote control, demodulate the IR signal, and transmit the demodulated signal to the processor 905.

However, if the remote control includes an RF module, the wireless communication unit 901 includes an RF module to receive an RF signal transmitted from the remote control and transmit the received RF signal to the processor 905. However, the wireless communication unit 901 is not limited to the IR receiver and the RF module described above. That is, the wireless communication unit 901 may be configured based on near distance communication, such as Bluetooth. The wireless communication unit 901 may be referred to as an input information reception unit (e.g., an input information receiver) for receiving user input information.

The communication unit 902 transmits and receives data to and from an external device (not shown) based on a wired network or a wireless network as described with respect to the communication unit 708 of FIG. 7 or transmits and receives data to and from the server 130 through the network 120 of FIG. 1.

The broadcast signal reception unit 903 splits a broadcast signal received through a tuner (not shown) into an image signal and an audio signal and outputs the image signal and the audio signal. That is, the tuner selects a broadcast signal corresponding to a channel selected by the user or an already stored channel from among broadcast signals received through an antenna. In addition, the broadcast signal reception unit 903 converts the selected broadcast signal into an intermediate frequency signal or a baseband image or audio signal. The intermediate frequency signal or the baseband image or audio signal is input to the processor 905.

The storage unit 904 may store at least one program for various kinds of signal processing and control in the processor 905, information for authentication of the device 110, information on the device 110, and the like. The information for authentication of the device 110 may include user information of the device 110. The at least one program for various kinds of signal processing and control in the processor 905 may include at least one program for executing an application as in the signaling diagram of FIG. 2, receiving a short run indicator mapping request signal, acquiring application execution information at a mapping request signal reception time point, mapping the acquired application execution information and a short run indicator, and storing mapping information in the storage unit 904 or in the server 130 through the communication unit 902.

The processor 905 may control an all functions of the device 110 and control the device 110 to transmit and receive data to and from the server 130 though the communication unit 902. The processor 905 may load at least one program stored in the storage unit 904, construct a UI screen according to according to an exemplary embodiment, and display the UI screen on the display unit 907 through the image processing unit 906.

The UI screen includes, for example, the UI screens according to execution of an application as shown in FIGS. 3A to 3F, FIGS. 4A to 4E, and FIGS. 5A to 5D. In addition, the UI screen may include a screen for selecting a short run indicator and a preview information screen in application re-execution based on mapping information, which will be described below. When a short run indicator is selected, the preview information screen may include information on an application to be re-executed by being mapped to the selected short run indicator. That is, the preview information screen may include at least one of screen information executed at a mapping request signal reception time point and guide information of an application executed up to the mapping request signal reception time point.

For example, if a selection signal of a short run indicator for the Skype application is set in FIG. 3D after a short run, screen information shown in FIG. 3D or a screen including information guiding a progressing state up to FIG. 3D may be provided as a preview information screen.

The processor 905 may transmit and receive data related to application execution to and from the server 130 connected thereto through the communication unit 902. To this end, the processor 905 may use at least one program and resources stored in the storage unit 904. Like the processor 710 of FIG. 7, the processor 905 may include at least one processor.

The image processing unit 906 includes an image decoder (not shown) and a scaler (not shown). The image processing unit 906 processes the image signal output from the broadcast signal reception unit 903 to display the processed image on a screen. The image decoder decodes a demultiplexed image signal, and the scaler scales the resolution of the decoded image signal so that the processed image is displayed by the display unit 907. The image decoder may include decoders of various standards.

For example, when the demultiplexed image signal is an encoded image signal of the MPEG-2 standard, the demultiplexed image signal may be decoded by an MPEG-2 decoder. As another example, when the demultiplexed image signal is an encoded image signal of a digital multimedia broadcasting (DMB) scheme or the H.264 standard according to DVB-H, the demultiplexed image signal may be decoded by an H.264 decoder.

The display unit 907 may output the image processed by the image processing unit 906. The output image may include an image received by the broadcast signal reception unit 903, a UI screen, and an image according to application execution, which is received from the server 130 through the communication unit 902. However, the display unit 907 may include a touch screen and may also be used as an input device.

The audio processing unit 908 processes the audio signal output from the broadcast signal reception unit 903 and an audio signal included in content received through the communication unit 902 and outputs the processing result to the audio output unit 909. The audio output unit 909 may be implemented in various forms to output a stereo signal, a 3.1-channel signal, or a 5.1-channel signal.

In addition, the audio processing unit 908 may process a signal input from the audio input unit 910 and transmit the processed result to the processor 905. The audio input unit 910 may include a microphone.

The display unit 907 and the audio output unit 909 may both be defined as an output unit 914 for outputting UI information according to information input through the wireless communication unit 901 or the user input unit 913 and outputting information according to application execution.

Since the camera 911, the port 912, and the user input unit 913 shown in FIG. 9 may be configured and operate similarly to the camera 704, the port 709, and the user input unit 701 shown in FIG. 7, respectively, a description thereof is omitted.

Figure 10:
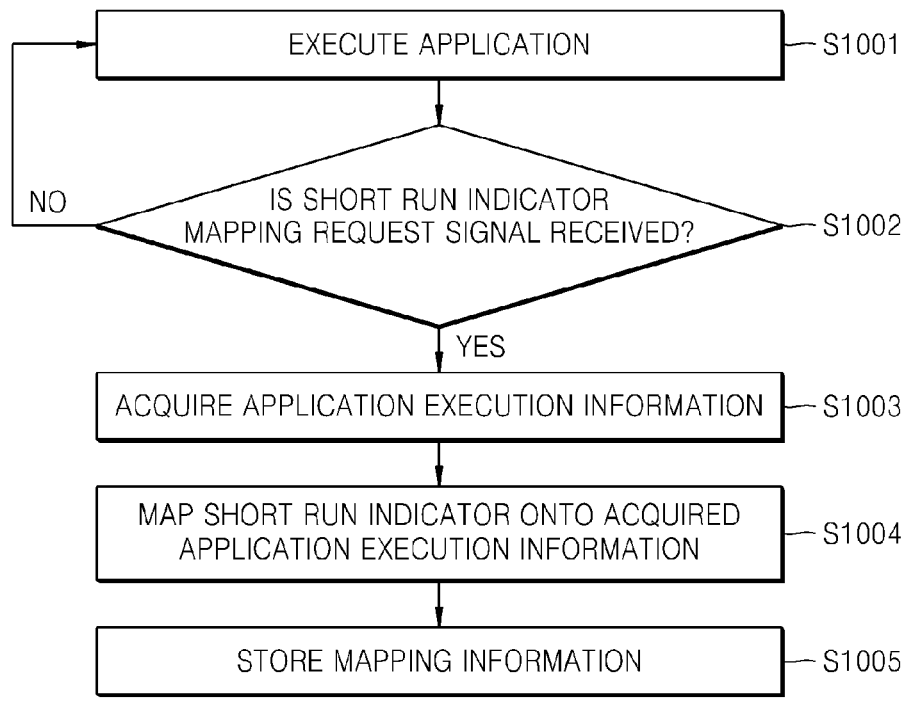
FIG. 10 is a flowchart for describing an operation of a device in a method of executing an application, according to an exemplary embodiment.

FIG. 10 is a flowchart for describing an operation of the device 110 in a method of executing an application, according to an exemplary embodiment. The processor 710 or the processor 905 may perform the operation of the flowchart of FIG. 10 by using at least one program and resources stored in the storage unit 707 or by using at least one program and resources stored in the storage unit 904, respectively. Hereinafter, for convenience of description, it is described that the flowchart of FIG. 10 is performed by the processor 710.

In operation S1001, the processor 710 of the device 110 executes an application. Accordingly, screen information according to the application execution is displayed on the touch screen 703.

While the application is being executed, if a short run indicator mapping request signal is received via the touch screen 703 or the user input unit 701 in operation S1002, the processor 710 acquires execution information of the application in operation S1003. The acquisition of the application execution information is the same as described with reference to FIG. 2.

In operation S1004, the processor 710 maps the acquired application execution information and a short run indicator. The mapped short run indicator may be selected based on at least one short run indicator generated as described with reference to FIGS. 2, 6A, and 6B.

In operation S1005, the processor 710 stores mapping information in the storage unit 707 or transmits the mapping information to the server 130 so that the server 130 stores the mapping information.

Figure 11:
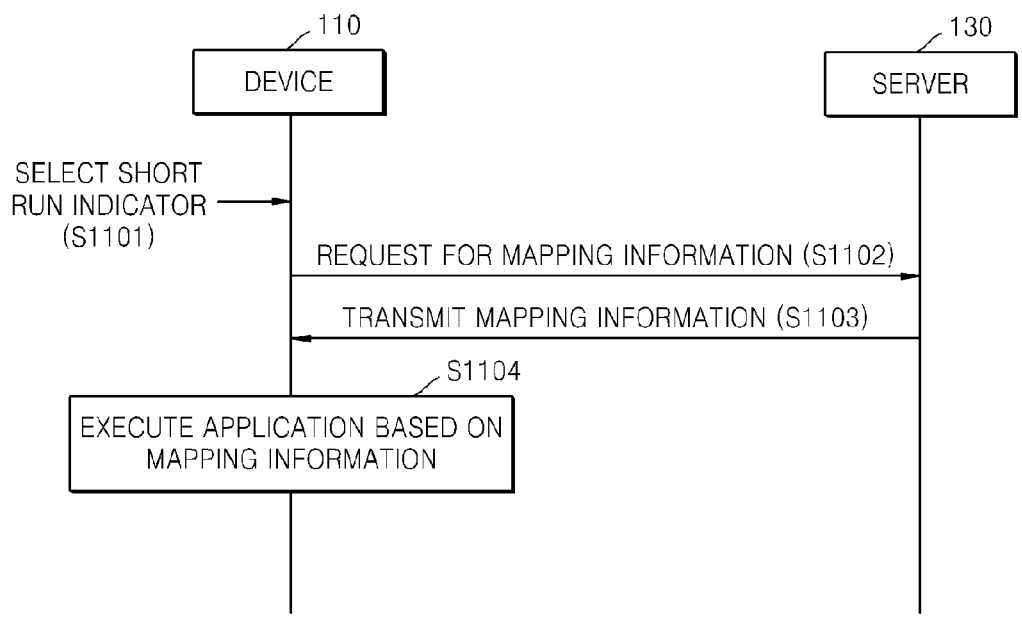
FIG. 11 is a signaling diagram for describing a method of executing an application, according to another exemplary embodiment.

FIG. 11 is a signaling diagram for describing a process of executing (or re-executing) an application based on mapping information in a method of executing the application, according to another exemplary embodiment. In this case, the mapping information is stored in the server 130.

When user input information indicating selection of a short run indicator is received in operation S1101, the device 110 submits a request to the server 130 for mapping information in operation S1102.

The user input information indicating selection of a short run indicator includes a channel number based on a channel change or channel setting in a case of a smart TV as described above. Thus, when a channel number corresponding to the short run indicator is enabled, the device 110 may recognize that the user input information has been input.

Figure 12A:
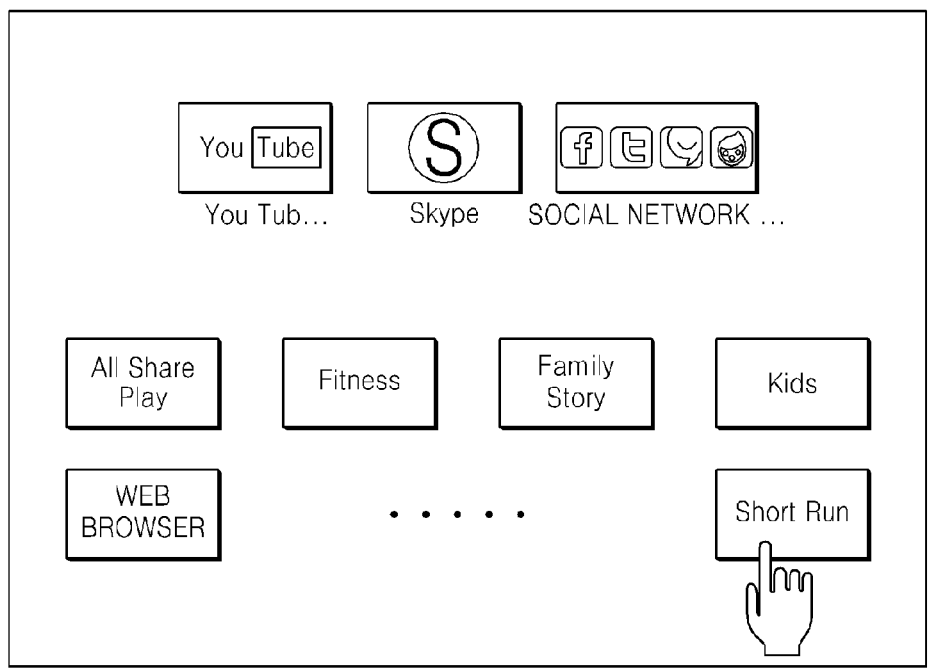
FIGS. 12A and 12B illustrate screens when an application is executed according to the signaling diagram of FIG. 11.
Figure 12B:
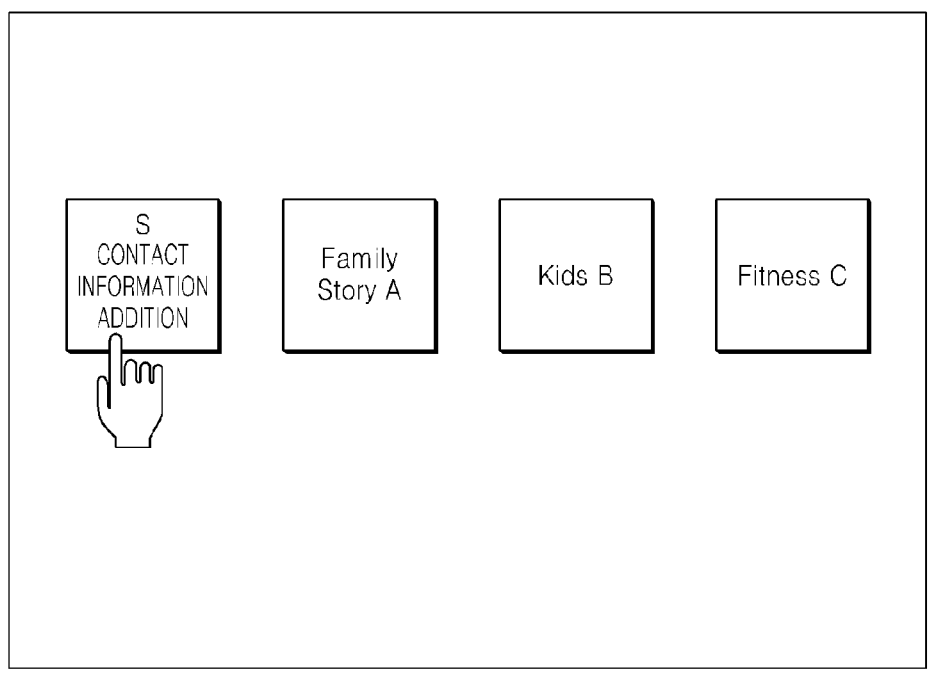

The user input information indicating selection of a short run indicator may be input based on a UI screen including short run indicators as shown in FIG. 12B, which are provided according to selection of a short run dedicated icon that is set on a menu screen as shown in FIG. 12A. Referring to FIG. 12B, there exists application execution information mapped to short run indicators "Skype (S) contact information addition", "Family Story A", "Kids B", "Fitness C". As shown in FIG. 12B, if the short run indicator "S contact information addition" is selected, the device 110 submits a request to the server 130 for mapping information based on the selected short run indicator. The short run indicators are not limited to those shown in FIG. 12B. For example, the short run indicators may be provided in a list form based on text information.

When the mapping information is received from the server in operation S1103, the device 110 executes an application based on the received mapping information in operation S1104. At this time, the device 110 may display preview information before executing the application. The preview information may include a message for confirming whether the application corresponds to the short run indicator selected by the user. That is, the preview information may include any one of screen information by which the user can perceive the execution contents of the application and guide information of the executed application.

When an application is executed using an application stored in the server 130, the server 130 may transmit the mapping information together with application execution information in operation S1103.

When mapping information is stored in the device 110 as shown in FIG. 2, the device 110 may read and use the mapping information from the storage unit 707 included in the device 110 instead of submitting a request to the server 130 for the mapping information.

The signaling diagram of FIG. 11 may be modified so that an application is re-executed after the mapping information storing operation of FIG. 2.

Figure 13:
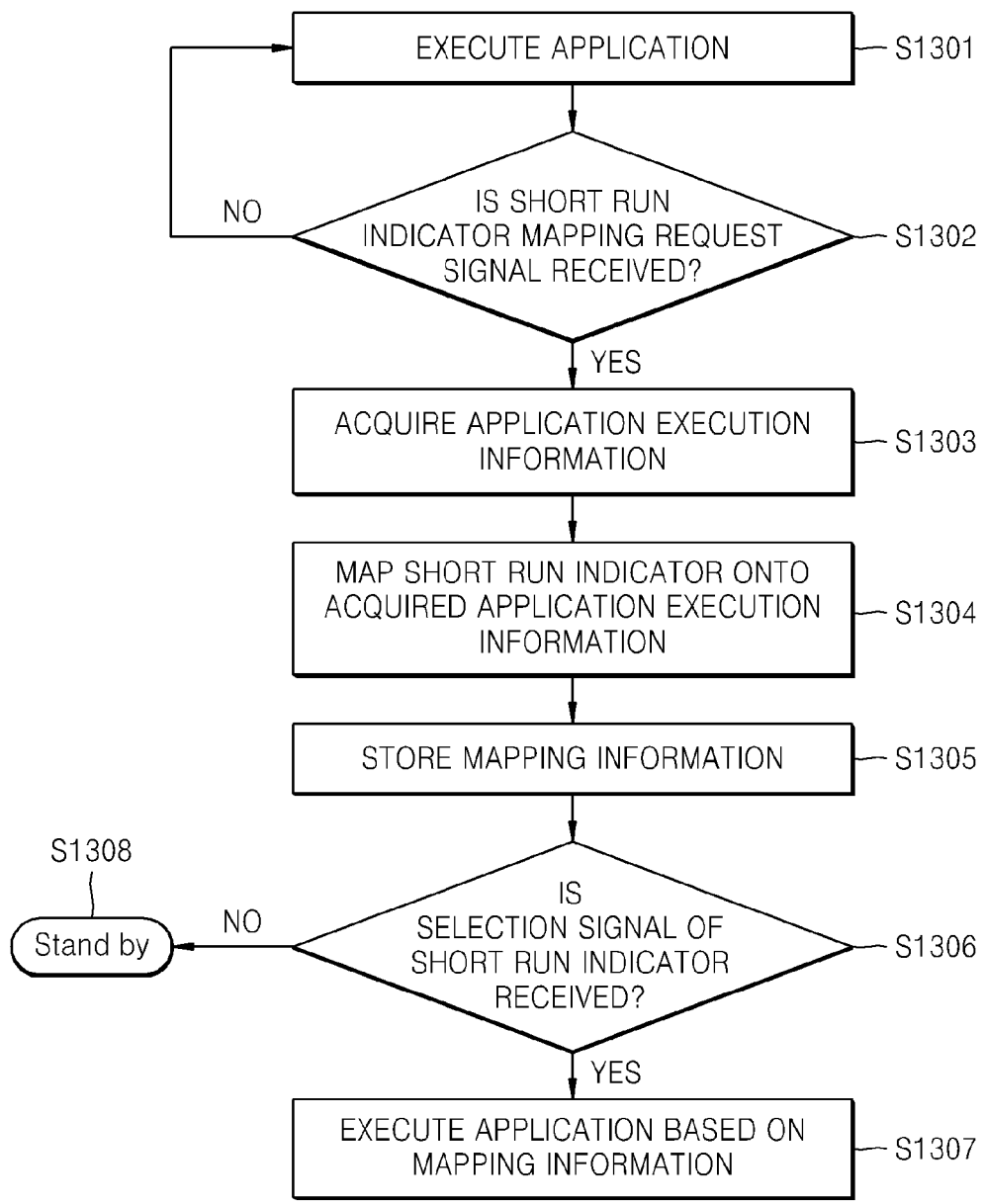
FIG. 13 is a flowchart for describing an operation of a device in a method of executing an application, according to another exemplary embodiment.

FIG. 13 is a flowchart for describing a method of executing an application, according to another exemplary embodiment. The flowchart of FIG. 13 is an example in which the signaling diagram of FIG. 11 is added to the flowchart of FIG. 10. Thus, since operations S1301 to S1305 of FIG. 13 are the same as operations S1001 to S1005, a description thereof is omitted.

If a selection signal of a short run indicator is received in operation S1306, the processor 710 executes an application based on mapping information in operation S1307. However, if a selection signal of a short run indicator is not received in operation S1306, the processor 710 maintains a standby state in operation S1308 for a command for performing the application executing method according to an exemplary embodiment or a command for performing another task. The standby state may be defined as an idle state.

Figure 14:
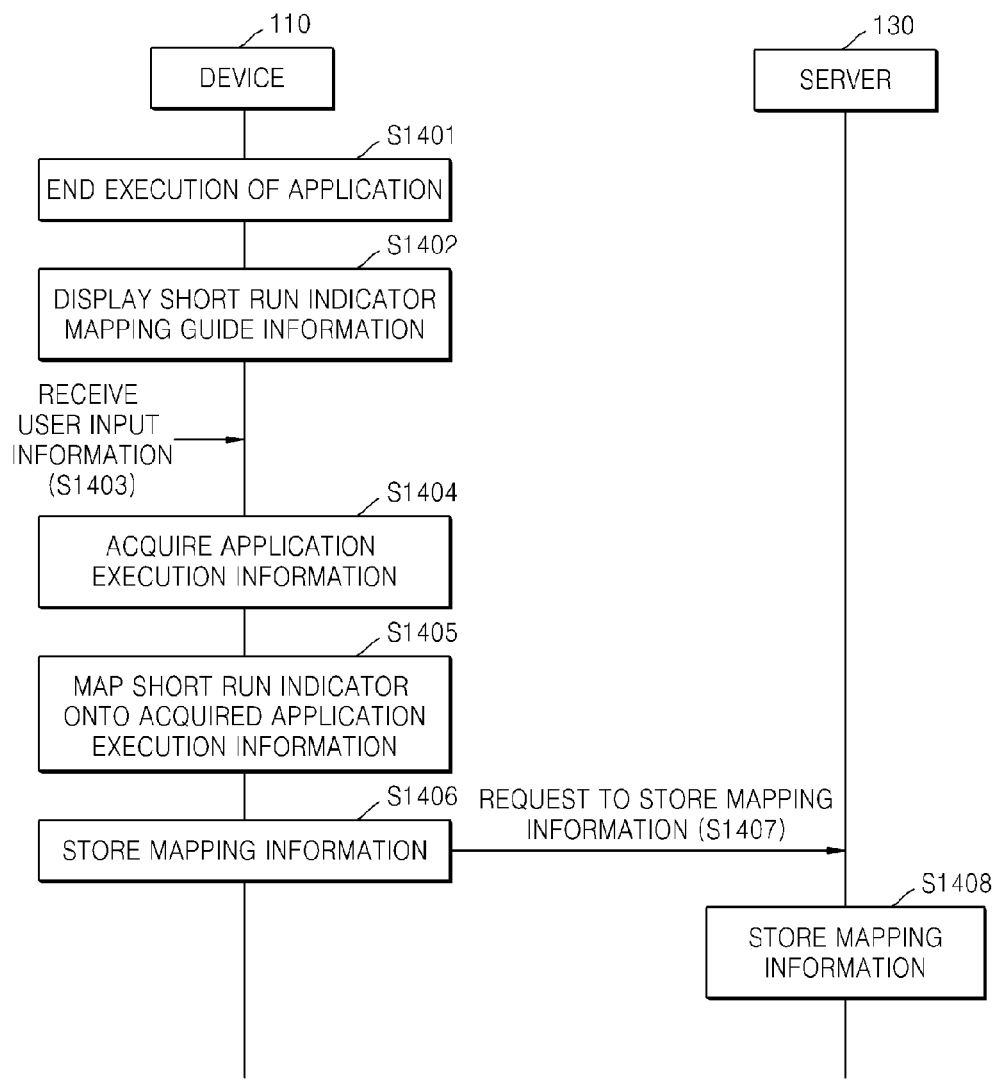
FIG. 14 is a signaling diagram for describing a method of executing an application, according to another exemplary embodiment.

FIG. 14 is a signaling diagram for describing a method of executing an application, according to another exemplary embodiment. FIG. 14 illustrates a case after an application ends in the device 110.

When an application being executed by the device 110 ends in operation S1401, the device 110 displays short run indicator mapping guide information thereon in operation S1402. The displayed guide information may include information on the executed application and a message for confirming whether the user desires to map a short run indicator to the executed application.

When user input information is received based on the displayed guide information in operation S1403, the device 110 acquires execution information of the application in operation S1404. The acquisition of the application execution information is performed in the same manner as in operation S203 of FIG. 2.

In operation S1405, the device 110 maps the acquired application execution information and a short run indicator. The short run indicator mapped to the acquired application execution information may be selected based on a criterion as described with reference to FIGS. 6A, 6B, and 6D and mapped to the acquired application execution information. Mapping information is stored in the device 110 in operation S1406 or is transmitted to and stored in the server 130 in operations S1407 and S1408.

The signaling diagram of FIG. 14 may be modified to be combined with the signaling diagram of FIG. 11 after storing the mapping information. Accordingly, a process repeated every time an application is executed based on mapping information may be automatically executed, thereby increasing application accessibility and usability.

One or more programs including instructions for performing a method of embodying an application executing method according to exemplary embodiments in a computer can be recorded as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and the like. The computer-readable recording medium can also be distributed over network coupled computer systems so that the computer-readable code is stored and executed in a distributed fashion.

While one or more exemplary embodiments have been described with reference to the figures, it will be understood by those of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the exemplary embodiments is defined not by the detailed description but by the appended claims, and all differences within the scope will be construed as being included in the inventive concept.

What is claimed is:

1. A method of executing an application by a device, the method comprising:

beginning, by the device, an execution of the application at an execution starting point;

storing, by the device, log information associated with the executing of the application, wherein the log information comprises information generated by user's actions or inputs during the executing of the application;

receiving, by the device, a request for mapping between an application execution information and a short run indicator during the executing of the application;

acquiring, by the device, the application execution information from the stored log information in response to receiving the request, wherein the application execution information corresponds to a portion of the log information beginning at the execution starting point of the application and ending at the receiving of the request;

mapping, by the device, the application execution information with the short run indicator;

storing, by the device, mapping information between the short run indicator and the application execution information in at least one of the device and an external device;

receiving, by the device, a user input or selection of the short run indicator when the application is not being executed by the device; and automatically executing, by the device, the application from the execution starting point of the application up to the receiving of the request based on the application execution information.

2. The method of claim 1, wherein the executing of the application comprises displaying preview information of the application before executing the application.

3. The method of claim 2, wherein the preview information includes at least one of screen information of the application and guide information for the screen information of the application.

4. The method of claim 3, wherein the screen information comprises information about a setting of the application, and wherein the guide information comprises information used to confirm whether the mapping information between the short run indicator and the application execution information exists.

5. The method of claim 1, further comprising:

displaying, on the device, at least one short run indicator which can be mapped to the application execution information, wherein selecting of the short run indicator is performed based on the at least one short run indicator being displayed.

6. The method of claim 1, wherein the short run indicator includes a channel number.

7. The method of claim 1, wherein the short run indicator includes a channel number, and the channel number is a vacant channel number classified according to an application type.

8. The method of claim 1, wherein the application execution information includes information on a reception time point of the request, user input information from the execution starting point of the application up to the reception time point of the request, and application identification information.

9. The method of claim 1, wherein the external device is a server connected to the device via a network.

10. The method of claim 1, wherein the application execution information comprises at least one from among setting information of the application, login information of the application, and user profile information of the application.

11. The method of claim 1, wherein the application execution information comprises user input information corresponding to the user's actions or inputs, and application operation information corresponding to an operation of the application.

12. A device for executing an application, the device comprising:

a communication interface which is configured to communicate with an external device;

a storage which is configured to store log information;

an input interface which is configured to receive a user input;

a display which is configured to output user interface information according to the received user input and information according to execution of the application; and a processor which is configured to:

begin an execution of the application at an execution starting point;

control the storage to store the log information associated with the execution of the application, wherein the log information comprises information generated by user's actions or inputs during the execution of the application;

receive a request for mapping between an application execution information and a short run indicator via the input interface during the execution of the application, acquire the application execution information from the stored log information in response to the receipt of the request, wherein the acquired application execution information corresponds to a portion of the log information beginning at the execution starting point of the application and ending at the receipt of the request, map the application execution information with the short run indicator, control storage of mapping information between the short run indicator and the application execution information in at least one of the storage of the device and the external device, receive a user input or selection of the short run indicator when the application is not being executed by the device, and automatically execute the application from the execution starting point of the application up to the receipt of the request based on the application execution information.

13. The device of claim 12, wherein the processor is configured to control the display to display preview information of the application before executing the application.

14. The device of claim 13, wherein the preview information includes at least one of screen information of the application and guide information for the screen information of the application.

15. The device of claim 14, wherein the screen information comprises information about a setting of the application, and wherein the guide information comprises information used to confirm whether the mapping information between the short run indicator and the application execution information exists.

16. The device of claim 12, wherein the processor is further configured to control the display to display at least one short run indicator which can be mapped to the application execution information, wherein the processor maps the application execution information with the short run indicator based on the at least one short run indicator being displayed.

17. The device of claim 12, wherein the short run indicator includes a channel number, and the channel number is a vacant channel number classified according to an application type.

18. The device of claim 12, wherein the application execution information includes information on a reception time point of the request, user input information from the execution starting point of the application up to the reception time point of the request, and application identification information.

19. The device of claim 12, wherein the application execution information comprises at least one from among setting information of the application, login information of the application, and user profile information of the application.

20. The device of claim 12, wherein the application execution information comprises user input information corresponding to the user's actions or inputs, and application operation information corresponding to an operation of the application.

21. A non-transitory computer-readable storage medium having stored therein program instructions, which when executed by a computer, perform a method of executing an application by a device, the method comprising:

beginning, by the device, an execution of the application at an execution starting point;

storing, by the device, log information associated with the executing of the application, wherein the log information comprises information generated by user's actions or inputs during the executing of the application;

receiving, by the device, a request for mapping between an application execution information and a short run indicator during the executing of the application;

acquiring, by the device, the application execution information from the stored log information in response to receiving the request, wherein the application execution information corresponds to a portion of the log information beginning at the execution starting point of the application up to the receiving of the request;

mapping, by the device, the application execution information with the short run indicator;

storing, by the device, mapping information between the short run indicator and the application execution information in at least one of the device and an external device;

receiving, by the device, a user input or selection of the short run indicator when the application is not being executed by the device; and automatically executing, by the device, the application from the execution starting point of the application up to the receiving of the request based on the application execution information.

* * * * *